(12) United States Patent
Mody et al.

(10) Patent No.: US 9,734,136 B1
(45) Date of Patent: Aug. 15, 2017

(54) METHODS, SYSTEMS, AND ARTICLES OF MANUFACTURE FOR RENDERING INTERNET CONTENTS ON DIFFERENT DISPLAYS OF MOBILE DEVICES

(71) Applicant: Intuit Inc., Mountain View, CA (US)

(72) Inventors: Yamit P. Mody, San Diego, CA (US); William K. Scarvie, III, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 294 days.

(21) Appl. No.: 14/562,549

(22) Filed: Dec. 5, 2014

(51) Int. Cl.
*G06F 17/22* (2006.01)

(52) U.S. Cl.
CPC .................. *G06F 17/2247* (2013.01)

(58) Field of Classification Search
CPC . G06F 17/30905; G06F 3/0481; G06F 3/0482
USPC .................................................. 715/238, 864
See application file for complete search history.

(56) References Cited

U.S. PATENT DOCUMENTS

| | | | | |
|---|---|---|---|---|
| 5,103,393 | A * | 4/1992 | Harris | G06F 15/17343 709/226 |
| 6,433,794 | B1 * | 8/2002 | Beadle | G06F 9/44505 715/700 |
| 7,254,526 | B2 * | 8/2007 | Aupperle | G06F 17/30864 703/27 |
| 7,590,947 | B1 * | 9/2009 | Gay | G06F 3/0483 715/798 |
| 7,805,349 | B2 * | 9/2010 | Yu | G06Q 10/10 705/36 T |
| 7,818,681 | B2 * | 10/2010 | Abuelsaad | G06F 9/44536 715/760 |
| 7,912,767 | B1 * | 3/2011 | Cheatham | G06Q 10/10 705/31 |
| 2003/0227461 | A1 * | 12/2003 | Hux | G06T 11/40 345/543 |
| 2005/0193324 | A1 * | 9/2005 | Purple | G06F 17/30905 715/273 |
| 2005/0246444 | A1 * | 11/2005 | Koehane | G06F 17/30905 709/227 |
| 2006/0271846 | A1 * | 11/2006 | Nickolov | G06Q 10/10 715/235 |

(Continued)

*Primary Examiner* — Andrew Dyer
(74) *Attorney, Agent, or Firm* — Vista IP Law Group LLP

(57) ABSTRACT

Mechanisms for natively rendering and optimizing Internet contents on different displays of mobile communication devices receive screen description for a webpage from a server supporting a Web server hosting a software application and prepare and transmit an inquiry to multiple painters to inquire whether these painters have native capability and functionality to paint a single screen for optimal viewing experiences on displays of mobile communication devices having different sizes or resolutions. A receiving painter includes its own decision mechanism to respond to the inquiry either affirmatively or negatively. A painter is selected from one or more painters receiving the inquiry and responding affirmatively. When no receiving painters respond affirmatively to the inquiry, a web view screen painter is selected to paint the screen on a mobile communication device display in a way that the screen resembles or appears exactly like the webpage when displayed on a computer display.

19 Claims, 21 Drawing Sheets

(56) References Cited

U.S. PATENT DOCUMENTS

| | | | | |
|---|---|---|---|---|
| 2007/0024889 A1* | 2/2007 | Eldridge | ............... | G06F 3/1218 358/1.14 |
| 2012/0260220 A1* | 10/2012 | Griffin | .................... | G06F 3/033 715/863 |
| 2013/0339842 A1* | 12/2013 | Zhang | ............... | G06F 17/30899 715/234 |
| 2014/0324944 A1* | 10/2014 | Christopher | .......... | H04L 67/025 709/203 |

* cited by examiner

METHODS, SYSTEMS, AND ARTICLES OF MANUFACTURE FOR RENDERING INTERNET CONTENTS ON DIFFERENT DISPLAYS OF MOBILE DEVICES

BACKGROUND

According to the statistics, ninety percent of American adults over 18 years old have a cell phone; and fifty-eight percent of American adults have a smartphone; and forty-two percent of American adults own a tablet computer. Mobile devices have joined laptop and desktop computers to become one of a primary means of communications for activities such as accessing the Internet, sending or receiving emails, and running various mobile applications, etc. in addition to making telephone calls and sending or receiving text messages.

Even the largest mobile devices such as some tablet computers have limited screen sizes. With the market requirements of having HD (high definition or 1280 pixels×720 pixels), full HD (1920 pixels×1080 pixels), quad HD (2560 pixels×1440 pixels), or even the recent 4 k (3840 pixels×2160 pixels at 16:9 aspect ratio or 4096 pixels×2160 pixels at 19:10 aspect ratio) resolution, webpages are often presented as either illegible screens on mobile device displays due to the high pixel densities of these displays and require zooming in to view or larger yet legible virtual screens that require users to scroll horizontally, vertically, or often both horizontal and vertically in order to view the entire content. To overcome the problem, mobile websites have been designed specifically for the smaller screens of mobile devices so that these websites may be displayed on mobile device screens via Web browsers.

Nonetheless, devising mobile websites while running regular websites optimized for laptop computers, notebooks, and desktop computers not only increase the cost of the business entities owning both websites but also cause operation difficulties in maintenance as well as ensuring the consistency between the contents of the regular websites and those of the mobile websites. Even if the regular websites and their mobile versions may be maintained properly, the sheer number of different sizes and/or resolutions of the displays of mobile devices often causes the optimization of the mobile device costly or impossible because a mobile website optimized for one screen size or resolution is no longer optimized for other sizes or resolutions and may sometimes produce some screens with undesirable arrangement or elements.

Therefore, there exists a need for a method, system, and computer product for natively rendering and optimizing Internet contents on different displays of mobile devices.

SUMMARY

Disclosed are various embodiments relating to methods, systems, and articles of manufacture for natively rendering and optimizing Internet contents on different displays of mobile communication devices or simply mobile devices. It shall be noted that the term "mobile communication device" and "mobile device" are used interchangeably throughout this application, unless otherwise specifically recited or distinguished. One or more embodiments are directed at painting a screen for a webpage for an online tax return filing process across multiple mobile devices having different screen sizes and/or resolutions in an optimized manner.

In these embodiments, the method may receive, at a mobile device, a screen description of a screen from a backend service server wherein the backend service server is operatively connected to a first server hosting a hosted software application to which the mobile device attempts to access, and the hosted software application comprises a tax return preparation software application; identify, by the mobile device, a plurality of data models for the screen by extracting the plurality of data models from the screen description; generate respective responses to at least one inquiry of whether the one or more painters or painter applications have native capability to paint the screen with one or more painters on the mobile device; and paint the screen by transforming at least one of the one or more data models into content of the screen with a painter selected from the one or more painters. Throughout this application, the terms "painter" and "painter application" are used interchangeably, unless otherwise specifically recited or distinguished.

In some of these embodiments, the one or more painters are stored in a priority list and comprise respective decision mechanisms that are used to generate the respective responses to the at least one inquiry. In addition or in the alternative, the one or more painters receive the at least one inquiry sequentially, in parallel, or in a distributed computing environment. The method may further optionally transmit the at least one inquiry to the one or more painters with a control mechanism in the mobile device; receive the respective responses generated by at least one or more decision mechanisms of the one or more painters with the control mechanism; and selecting the painter based in part or in whole upon the respective responses with the control mechanism in some embodiments.

In some of these embodiments, the control mechanism selects the painter from a first painter that responds affirmatively to the at least one inquiry. Additionally or alternatively, the control mechanism gathers the respective responses from the one or more painters and selects the painter by using a voting mechanism or a weighted mechanism. Furthermore, the method may optionally ignore a first painter in the mobile device by not sending the at least one inquiry to the first painter in some embodiments. In some embodiments, a first painter in the mobile device may paint the plurality of data models by generating and storing a layout for displaying the plurality of data models in a volatile memory and check a boundary of the layout against a boundary of a display of the mobile device.

In some of these embodiments, the mobile device may optionally select the first painter to paint the screen, wherein the one or more painters respond negatively to the at least one inquiry based in part or in whole upon a result of the first painter checking the boundary of the layout against the boundary of the display of the mobile device. In addition or in the alternative, the mobile device may select a web view screen painter to paint the screen, where the one or more painters respond negatively to the at least one inquiry based in part or in whole upon a result of the first painter checking the boundary of the layout against the boundary of the display of the mobile device. In some embodiments, the mobile device may detect a change in an orientation of a display of the mobile device by using at least an accelerometer in the mobile device; and the painter selected from the one or more painters may re-paint the screen by transforming at least one of the one or more data models into content of the screen based in part upon the change in the orientation of the display of the mobile device. Some of the aforementioned embodiments are directed to various methods and mechanisms for tax return preparation technologies and computer-implemented methods that are used solely for preparing a tax or information return or other tax filing, and that record, transmit, transfer, or organize data related to such filing. Some other embodiments are directed to various methods and mechanisms for financial management, to the extent that it is severable from any tax strategy or does not limit the use of any tax strategy by any taxpayer or tax advisor.

Certain embodiments are directed at an apparatus for implementing various processes described herein. More details about the apparatus for implementing various processes will be described in some of the subsequent paragraphs with reference to one or more drawing figures. Some of the aforementioned embodiments are directed to various apparatuses and mechanisms for tax return preparation technologies and systems that are used solely for preparing a tax or information return or other tax filing, and that record, transmit, transfer, or organize data related to such filing. Some other embodiments are directed to various apparatuses and mechanisms for financial management, to the extent that it is severable from any tax strategy or does not limit the use of any tax strategy by any taxpayer or tax advisor.

Certain embodiments are directed at an article of manufacture having stored thereupon a sequence of instructions which, when executed by a mobile computing or communication device, causes the mobile computing or communication device to perform various processes or to invoke various modules described herein. More details about the article of manufacture will be described in some of the subsequent paragraphs with reference to one or more drawing figures. Some of the aforementioned embodiments are directed to various computer program products and mechanisms for tax return preparation technologies that are used solely for preparing a tax or information return or other tax filing, and that record, transmit, transfer, or organize data related to such filing. Some other embodiments are directed to various computer program products and mechanisms for financial management, to the extent that it is severable from any tax strategy or does not limit the use of any tax strategy by any taxpayer or tax advisor.

The described mechanisms paint or render (collectively paint hereinafter) Internet contents of a Web page into a single screen and optimize the single screen without requiring any mobile website or the mobile version of the Web page. The described mechanisms may be at least partially embodied in a mobile application or mobile application software (collectively "mobile app" or "mobile application") installed on a mobile device and provide optimized screens regardless of different display sizes or display resolutions. A mobile app comprises a computer program designed to run on mobile devices and are often platform specific and are thus available through application distribution systems such as Apple's APP STORE®, Amazon Appstore, GOOGLE PLAY®, WINDOWS PHONE® Store from MICROSOFT®, and BLACKBERRY APP WORLD®. Moreover, these described mechanisms provide optimized screens for Internet webpages without any modifications to the regular websites, which are often optimized for laptop or desktop computers, or to their respective backend Web services.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 6C illustrates the second web view screen for the same second webpage in one or more embodiments.

FIG. 8B illustrates the fourth web view screen for the same fourth webpage in one or more embodiments.

FIG. 9B illustrates the fifth web view screen for the same fifth webpage in one or more embodiments.

Figure 1:
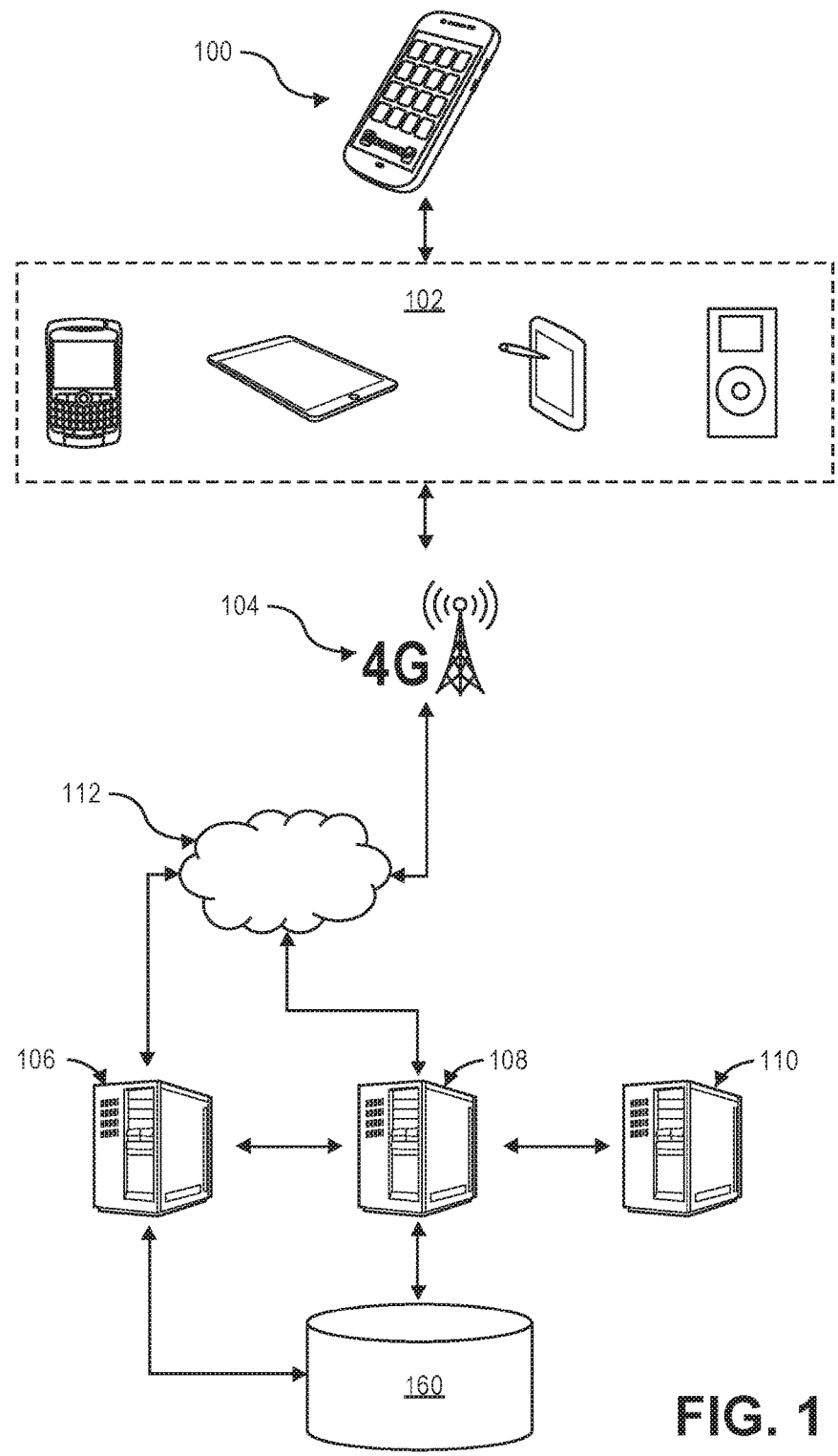
FIG. 1 illustrates a high level block diagram of a system for natively rendering and/or optimizing Internet contents on different displays of mobile devices in one or more embodiments.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Some embodiments are directed at a method or system that renders and/or optimizes Internet contents on different displays of mobile devices. Some other embodiments are directed at a non-transitory computer accessible storage medium that stores a computer program which, when compiled and executed by a mobile device, causes the mobile device to perform the method for rendering and/or optimizing Internet contents on different displays of mobile devices. When a user attempts to access a webpage of a hosted software application (e.g., an online tax return preparation and filing software application) on a hosting server, these embodiments first receive a screen description for the webpage from a backend service server (e.g., a server providing Web services to the hosting server) that powers and supports the hosting server.

The screen description includes various data models for the webpage or information therefor, and the data models or the information is determined by a parser (e.g., a JSON parser) on the backend service server. The mobile device receives the screen description and prepares at least one inquiry according to the received screen description. The control mechanism in a mobile application installed on the mobile device may send the at least one inquiry to one or more painters in a priority list of painters stored in the non-volatile memory of the mobile device. The at least one inquiry inquires the receiving one or more painters whether or not these one or more painters have the native capability and functionality to paint the screen according to the screen description. Each receiving painter includes its own decision mechanism to examine the inquiry, decide whether or not it has the native capability and functionality to paint the screen according to the screen description, and respond affirmatively when it does have the native capability and functionality or negatively when it does not.

The control mechanism then selects a painter from a painter that responds affirmatively to the inquiry. The control mechanism may or may not send the inquiry to a collection view screen painter because a collection view screen painter has the capability and functionality to paint all or nearly all data models of any webpages and hence can almost always paint any screens. That is, a collection view screen painter almost always responds affirmatively to any inquiry. The control mechanism may also send the inquiry to a collection view screen painter because although a collection view screen painter can paint nearly all screens, the resulting screens produced by a collection view painter may not necessarily fit within the display of a mobile device. When a collection view screen painter receives a painter, it will attempt to paint the screen and determine whether the attempted screen fits the display of the mobile device on which the collection view screen painter is installed. If the decision mechanism of a collection view screen painter determines that the attempted screen does not fit within the display of the mobile device, the response or communication mechanism of the collection view painter will respond negatively to the inquiry.

A painter responding affirmatively to the inquiry will be selected to paint the screen according to the screen description received from the backend service server. The screen painted constitutes a single screen that is optimized for the mobile device on which various mechanisms described herein are installed. If none of the receiving one or more painters respond affirmatively to the inquiry sent from the control mechanism, a web view painter will be selected to paint the screen that looks exactly or nearly exactly the same as the webpage viewed on a computer display.

One of the advantages is that various embodiments described herein paint each screen as a single screen that not only fits but is also optimized for the display of the mobile device on which various mechanisms are installed. As a result, users no longer need to zoom in or scroll horizontally and/or vertically in order to view the entire content in the screen. Another advantage is that a painter will optimize and paint a screen for the same screen description across multiple mobile devices having different display sizes and/or resolutions and running the same mobile operating system, different versions of the same mobile operating system, or slight variants of the same version or different versions of mobile operation systems. More details about various aspects are described below with reference to FIGS. 1-10.

FIG. 1 illustrates a high level block diagram of a system for natively rendering and optimizing Internet contents on different displays of mobile devices in one or more embodiments. In these one or more embodiments illustrated in FIG. 1, a mobile device 102 having a mobile application 100 installed thereupon may invokes its mobile communication chip (e.g., a fourth generation or 4G communication chip, a Wi-Fi chip, a messaging mechanism, an email mechanism, etc.) to connect to a cellular network 104 (e.g., a 4G LTE or fourth generation Long Term Revolution) to access the Internet.

A mobile device may include a handheld computing device having a display with touch or non-touch input and/or a built-in miniature keyboard and a communication subsystem that connects the mobile device to the Internet such as a cell phone, a smart phone, a phablet, a tablet computer, or any other handheld device having Internet connectivity such as some music players or enterprise digital assistants (EDAs). A mobile device may also include computation resources (e.g., processor, memory, instruction and data cache, etc.) to perform various functions described herein. A mobile device is distinguishable from a computer (e.g., a laptop, a nettop, or a netbook) in that a mobile device can be held and often can be operated with one hand, although some larger mobile devices (e.g., tablet computers) may be held with one hand and operated with the other hand to exploit its full functionality in an efficient manner.

In comparison, even if a computer can be held in one hand and operated with the other hand, such a computer cannot be operated to exploit the full functionality of the computer, or at least not in an efficient manner. A mobile device may also be distinguished from a computer by the form factors. For example, the form factor of a computer such as a laptop, a notebook, a nettop, and a desktop comprises two main parts—a screen and a physical keyboard attached to the screen by hinges or sliding mechanisms. In comparison, a mobile device may also include these two parts (a screen and a physical keyboard), but the screen of a mobile device is generally laid out on the same, integral body of the device. A mobile device may also be distinguished from a computer by the operating systems. A computer generally runs on a version of Windows® operating system or a version of MAC OS®, whereas a mobile device usually runs on a mobile operating system (or mobile OS) such as a version of the IOS®, ANDROID®, SYMBIAN®, WINDOWS MOBILE®, PALM OS®, WEBOS®, Maemo, MEEGO®, LIMO®, etc.

The cellular network 104 may further interact with one or more servers via the Internet 112 provided by various Internet service providers. These one or more servers may include, for example but not limited to, a first server 108 hosting applications including, a personal or corporate financial management system (not shown), an online federal tax return filing system, a state tax return filing system, etc. The one or more servers may further include a backend server 106 providing various backend services such as Web services for the first server 108. The first server 108 may also be operatively connected to a second server 110 such as one or more servers at the Internal Revenue Service (IRS) for electronically filing tax returns or one or more servers at various financial institutions such as banks, investment institutions, credit card issuing institutions, payment gateways, etc.

The first server 108 and the backend server 106 may access a storage device that may be implemented within either the first server 108, the backend server 106, or remotely on a separate server (not shown) to read data from or write data to the storage device for persistent storage. The mobile device 102 may operatively connect to both the first server 108 (e.g., a server hosting an online tax filing application) and the backend server 106 via the Internet 112 and the cellular data network 104 to receive data from or transmit data to any of these servers.

For example, the mobile application 100 on the mobile device 102 may receive a user input to access a webpage hosted on the first server 108 and transmit a request for the webpage. The backend server 106 may transmit a screen description or definition (hereinafter description) back to the mobile device 102 in response to the request. The mobile application 100 may paint the screen by using the native controls and implementation mechanisms of the mobile device 102 according to the screen description and display a single screen that fits the display of the mobile device 102 such that the user may view the entire content of the screen without having to scroll or zoom in for the content of the screen to be legible. The user may further enter some user specific data in the screen, and the mobile application 100 may relay the user specific data back to the backend server 106 or the first server 108 such that the user specific data may be examined for styles or format and displayed in the right field.

The first server 108 hosts thereupon a website (not shown) that is optimized for WINDOWS® or MAC OS®, and the website is supported by the backend server 106 which provisions, for example, JSON (JavaScript Object Notations), XML (Extensible Markup Language), YAML (a recursive acronym for "YAML Ain't Markup Language"), or other similar standards to parse data in a webpage into data models and/or transmit data models across various computing devices such as between backend server 106 and the mobile device 100 or between the first server 108 and other computers (not shown). When a webpage is to be displayed in the display of the mobile device 102 (e.g., when a user requests the webpage, or when a hosted application transmits a webpage to the user), the backend server 106 transmits the corresponding screen description for the webpage to the mobile application 100, and the mobile application 100 performs various functions described herein.

The mobile application 100 determines a painter from a priority list of painters to paint a screen for the webpage in a manner that is optimized for the display of the mobile device 102. Mobile applications are usually operation system specific. That is, different operation systems provide different development kits including different native controls, native UI (user interface) elements, etc. for the same mobile applications running on these different operation systems. The mobile application 100, although operation system dependent, may nevertheless determine a right painter having the native capability and implementation components for painting a screen on displays of mobile devices in an optimized manner, regardless of the sizes or resolutions of the mobile devices running the same operation system. More details about the aforementioned functionality will be provided below with reference to FIGS. 2-9B.

Figure 2:
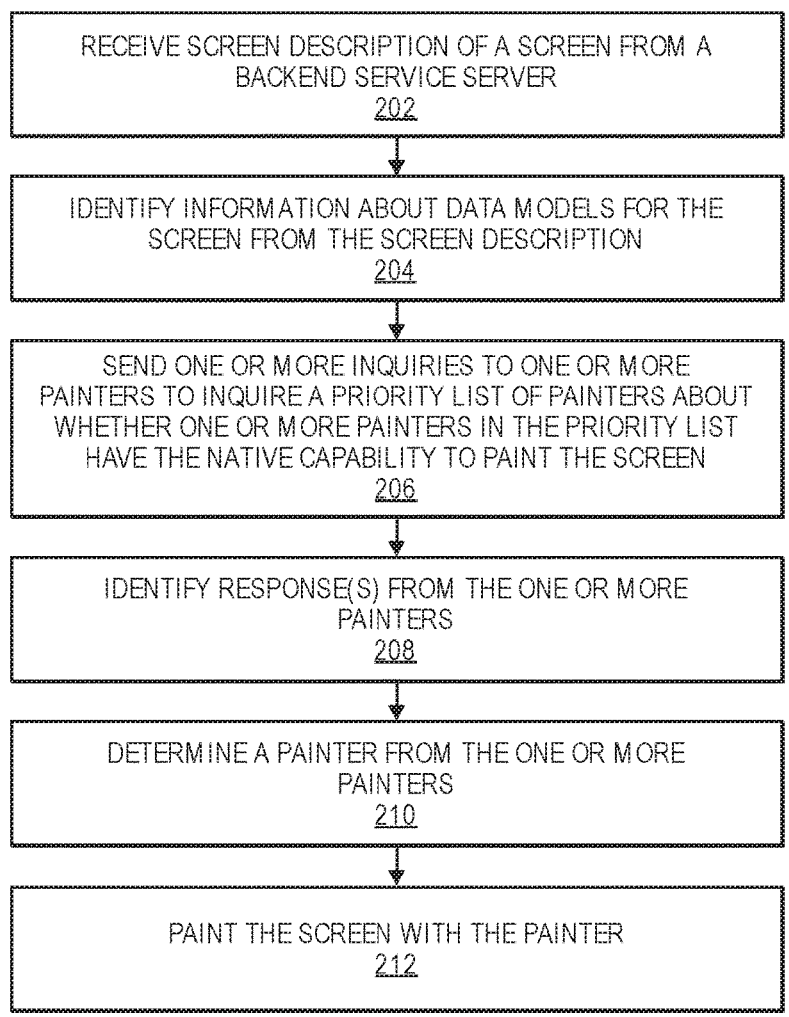
FIG. 2 illustrates a high level block diagram of a method or system for natively rendering and optimizing Internet contents on different displays of mobile devices in one or more embodiments.

FIG. 2 illustrates a high level block diagram of a method or system for natively rendering and optimizing Internet contents on different displays of mobile devices in one or more embodiments. In these one or more embodiments, a mobile device may receive a screen description of a screen for a webpage at 202 from a backend server (e.g., the backend server 106). At 204, information about data models in the webpage may be identified from the screen description in some embodiments. In some of these embodiments, the data models themselves in the webpage may be identified at 204. A screen description may include information about various data models (e.g., graphic elements, data entry fields, text, tables, etc.) of the webpage in some embodiments. For example, a screen description may include information about the attributes, various fields, various keys, the corresponding values, labels, the schema, metadata, objects, arrays, strings, etc. of a webpage that are produced by, for example, parsing the webpage using a parser (e.g., a JSON parser) in the backend server. In some other embodiments, the screen description may include the data models that are determined by the backend server.

At 206, one or more inquiries may be sent to one or more painters or renderers (collectively "painters" or "painter applications" hereinafter) in a priority list of painters. In some embodiments, the priority list of painters may be stored in the mobile application and may be invoked or inquired into by a mobile application installed on a mobile device. A painter or a renderer (collectively "painter" or "painter application" hereinafter), once selected, paints or renders a single screen for at least a part of the content of a webpage and displays the single screen on a display of a mobile device such that users may view the entire content of the screen without having to scroll or zoom in.

It shall be noted that some elements in the single screen (e.g., copyright notice) may be intentionally shrunk and presented in a manner that is not necessarily legible without zooming in so as to save the invaluable estate of the mobile device display. Nonetheless, with the exception of such intentionally reduced display items, the single screen may show the entire content of the screen without requiring users to vertically or horizontally scroll or zoom in any particular portion of the screen in order to legibly view the content. An inquiry includes a question for a painter to answer, and the question essentially asks a recipient painter whether or not the painter can paint the screen with its native functionality and capability that is built-into the mobile device, without custom functionality, data, program code, or conversion modules to create the single screen for the screen description.

A priority list of painters may include a list of painters corresponding to no specific orders or rankings in some embodiments. For example, a priority list of painters may include a table painter to paint screens for webpages populated with tables (and other data models), a "guide me" painter to paint screens for webpages providing step-by-step guidance or guidance for specific topics (e.g., "learn me") to users, a hint-based painter to paint screens including various hints, labels, pop-up balloons of text, pop-up windows of text, etc. to provide hints to users, a summary painter to paint screens of webpages including summaries of information from multiple sources (e.g., information provided by a hosted application, user entered data, etc.) to summarize what has been collected or gathered so far in a process flow, a collection view painter to paint screens of webpages, and a web-view painter to paint screens of webpages in exactly the same way as what the webpages will be displayed in a computer browser.

These painters may be collectively stored in a priority list without having any specific priorities, orders, weights, or rankings in some embodiments. In some other embodiments, the priority list of painters may include the priority information associated with some or all of the painters. In the aforementioned example, the table painter (or another painters) may be associated with a higher priority than, for example, the other painters in the priority list; the collection view painter may be associated with the second to the lowest priority; and the web-view painter may be associate with the lowest priority in the priority list.

The one or more painters in the priority list may be inquired into sequentially in some embodiments, in parallel in another embodiment, or in a distributed computing environment in some other embodiments. That is, the one or more painters may be inquired into one by one in some embodiments, or all of the one or more painters may be inquired at once in some other embodiments.

At 208, one or more respective responses may be identified from the one or more painters inquired into at 206 in some embodiments. In some of these embodiments, each painter includes its own decision logic to determine the answer to the inquiry sent at 206. For example, an inquiry transmitted to a painter in a priority list may include the information of data models for a screen description or even the data models themselves. The receiving painter, knowing its native capability and functionality, may examine the information for the data models or the data models and determines whether or not the painter can paint a single screen for the screen description.

For example, a screen description for a webpage providing guidance to users may include the information about an UI element "guide me", "learn me", etc. or even the data model of the UI element itself. A table painter, on the other hand, may be made aware of its native capability and functionality of painting screens including table or array data types and styles but not necessary the capability or functionality to paint the UI element and bind the corresponding data correctly. When the table painter receives the inquiry for the aforementioned screen description, the table painter examines the information about the data model, the UI element, and determines that it does not have the native capability or functionality to paint a screen including the UI element. The table painter will respond negatively to the inquiry.

As another example, a screen description for a webpage providing tabular data or information to users may include the information about the table or array data models or even the table or array data models themselves. A "guide me" painter, on the other hand, may be made aware of its native capability and functionality of painting screens including an UI element (e.g., a button showing "Guide Me") but not necessary the capability or functionality (e.g., styles, data types, etc.) to paint tables or arrays and bind the corresponding data correctly. When the "guide me" painter receives the inquiry for the aforementioned screen description, the "guide me" painter examines the information about the data model, the tables or arrays, and determines that it does not have the native capability or functionality to paint a screen including the table or array data models. The "guide me" painter will respond negatively to the inquiry.

At 210, a painter will be selected from the one or more painters in the priority list based in part or in whole upon the one or more responses from the respective one or more painters. In some embodiments where the one or more painters are inquired into sequentially, the first painter responding affirmatively to the inquiry will be selected at 210. In some other embodiments where the one or more painters are inquired into sequentially, the process may await all the answers from all of the one or more painters inquired into and use a voting or weighting mechanism to select one painter from multiple painters that respond affirmatively to the inquiry.

For example, the process may further examine the progress of a process flow (e.g., a tax return filing process provided by a hosted online tax returning filing application accessible via a mobile application installed on a mobile device) and assign different weights to multiple painters that respond affirmatively to the inquiry. The process may then identify a painter based in part or in whole upon the respective weights of the painters. For example, a user usually enters personal information (e.g., name, address, social security number, incomes, deductions, etc.) in various tabular forms. The process may thus assign a higher weight to a table painter at or near the beginning of the tax return filing process. At 212, the screen for the screen description may be painted by using the painter determined at 210.

Figure 3A:
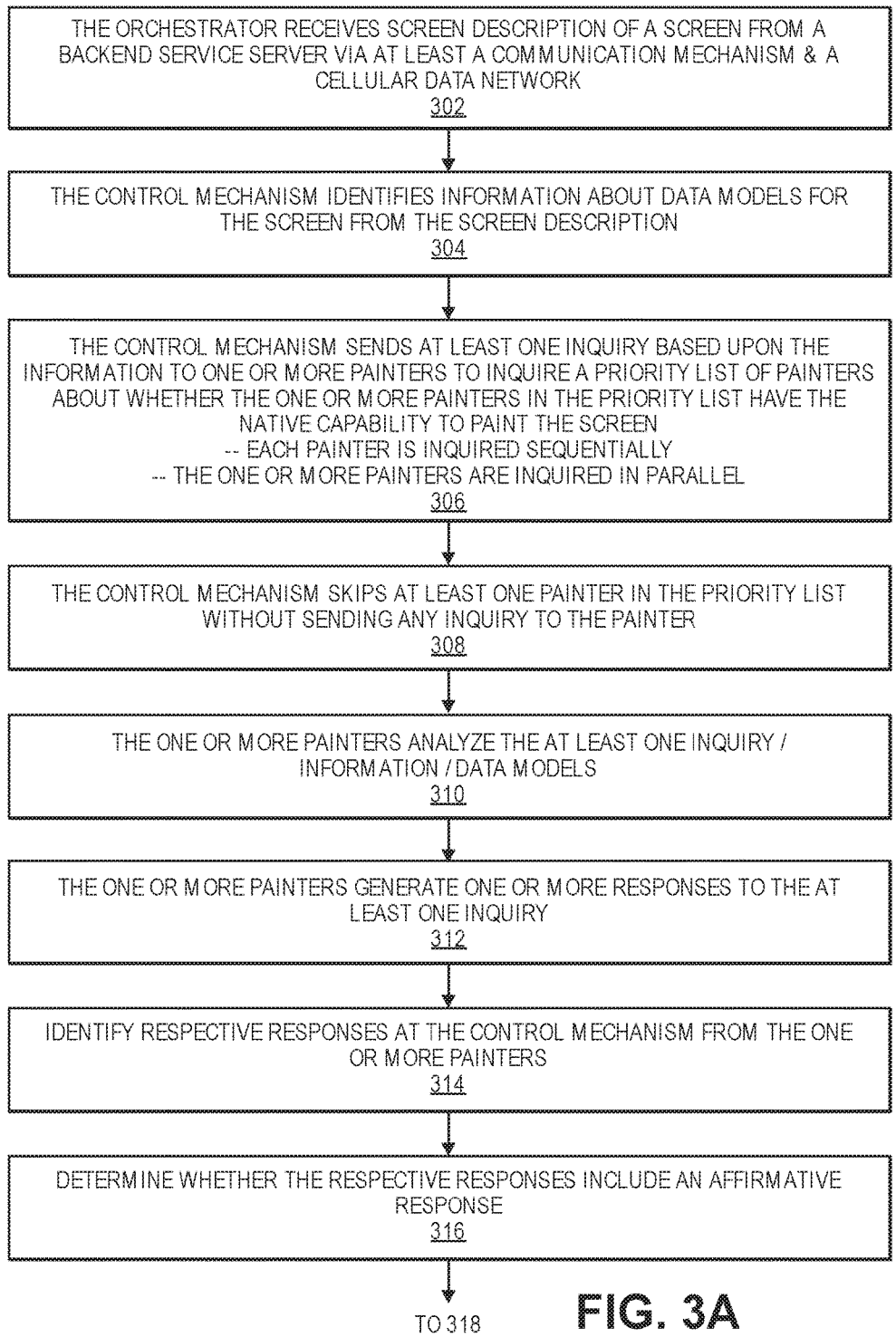
FIGS. 3A-B jointly illustrate a more detailed block diagram for natively rendering and optimizing Internet contents on different displays of mobile devices in one or more embodiments.
Figure 3B:
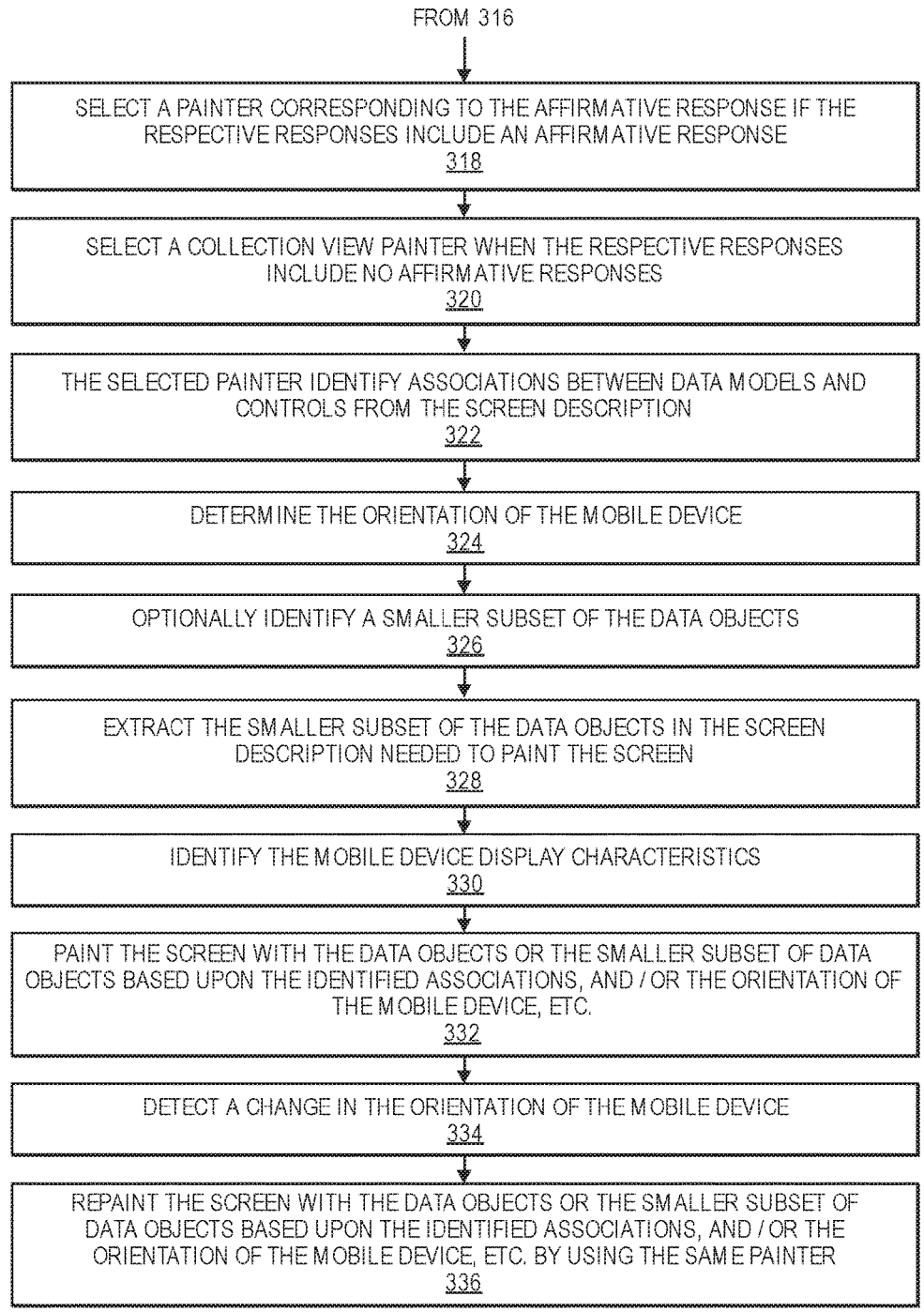

FIGS. 3A-B jointly illustrate a more detailed block diagram for natively rendering and optimizing Internet contents on different displays of mobile devices in one or more embodiments. In these one or more embodiments, an orchestrator may receive a screen description of a screen from a backend service server via at least a communication mechanism (e.g., a 4G LTE chip) of a mobile device and a cellular data network (e.g., 4G network) at 302. An orchestrator includes a mechanism that transmit data or information between various servers and a mobile device and can be a part of the mobile device, an individual computing system separate from the servers and the mobile device, or a part of one the website hosting server (e.g., a server hosting an online tax return preparation and filing application) or a backend server for the website hosting server.

For example, an orchestrator may transmit screen descriptions to mobile devices and may gather and transmit user entered data back to the backend server or the website hosting server to ask the server to place the user entered data in correct fields of a form. At 304, the control mechanism including the processor of the mobile device may identify information about data models for the screen from the screen description. In some embodiments, the control mechanism may identify the data models in the screen description at 304. At 306, the control mechanism of the mobile application installed on the mobile device may send at least one inquiry, which is determined based in part or in whole upon the screen description, to one or more painters in a priority list of painters to inquire these one or more painters about whether or not these one or more painters have the native capability and functionality to paint the screen according to the screen description. In some of these embodiments, each painter of the one or more painters is inquired sequentially. In some other embodiments, the one or more painters are inquired in parallel in substantially similar or identical manners as those described with reference to FIG. 2.

In some of these embodiments, one or more first painters are ignored at 308 by the control mechanism sending the at least one inquiry and thus does not receive the inquiry. In the example provided for reference numeral 206 of FIG. 2, for example, the web view painter or the collection view painter may be ignored by the control mechanism sending the at least one inquiry at 306 in some embodiments. The web view painter paints the screen in exact the same manner as a webpage will be produced on a computer screen and can thus always produce the screen on the mobile device display. Therefore, a web view painter's response to any inquiry of painting screens is always affirmative so there is no need to send the inquiry, at least at the beginning of the inquiry process.

By skipping sending an inquiry to the web view painter, the efficiency and hence the functioning of the mobile device can be improved by saving the processing time and the number of processor or clock cycles for sending and responding to the inquiry. In addition or in the alternative, a collection view painter will attempt to paint all the data models of a webpage included in, for example, the screen description, perform the sizing (e.g., applying one or more reduction factors to one or more data models) and adjustments (e.g., eliminating some spacers in the screen) on the data models, layout all the data models (with the exceptions of data models such as spacers that have been eliminated), determine whether the boundary of the layout of the data models fit within the boundary of the mobile device display, and store the processing results temporarily in at least a volatile memory (e.g., random access memory in the mobile device) when the layout fits within the mobile device display, in case the collection view painter is subsequent selected to paint the screen.

Therefore, the collection view painter may almost always paint all the data models of a webpage, and the only item preventing the collection view painter from being selected is when the layout produced by the collection view painter does not fit within the mobile device display to generate a single screen for users. Consequently, there is almost no need to send the at least one inquiry in some embodiments until the other painters respond negatively. By skipping sending an inquiry to the collection view painter, the efficiency and thus the functioning of the mobile device can be improved by saving the processing time and the number of processor or clock cycles for sending and responding to the inquiry because the collection view painter no longer needs to perform the exercise of painting the screen and/or storing the attempted layout in a non-transitory storage medium. The execution time of the entire mechanism is also shortened as compared to sending an inquiry to every painter in a priority list of painters on a mobile device.

At 310, the one or more painters analyze the at least one inquiry, the information determined from the screen description and associated with the data models, or the data models themselves. For example, a painter may examine the styles (e.g., the styles specified in the CSS or cascading style sheets) applied to the screen and/or data models, data types (e.g., arrays, tables, etc.), how data models are laid out, the presence or absence of association or linking between data models and controls for placement or presentation of the data models, the sequence of elements or data models to be presented in the screen, whether specific words, UI elements, etc. are present in the models, etc. at 310.

A painter is also made aware of its native capability and functionality and thus knows whether or not it can paint the screen by using its own built-in decision logic to compare the inquiry, the information about the data models, or the data models with its own native capability or functionality built into the mobile application itself from, for example, the development kit of the mobile device operation system developer or the platform or architecture of the mobile device developer. The one or more painters may then generate their respective one or more responses at 312 to the at least one inquiry based in part or in whole upon the analysis results obtained at 310.

For example, if a painter's decision logic or mechanism including or working in conjunction with the processor of the mobile device determines that it has the native functionality and capability to paint the data models according to the screen description, the painter may respond affirmatively to the inquiry of whether the painter can paint the screen according to the screen description. On the other hand, if a painter's decision logic or mechanism determines that it does not have the native functionality and capability to paint all the data models according to the screen description, the painter may respond negatively to the inquiry of whether the painter can paint the screen according to the screen description. It shall be noted that a painter need not paint all the data models of a webpage in some embodiments.

For example, the set of all data models from a JSON screen description optimized for a computer screen display operating under a computer operating system (e.g., WINDOWS®, MAC OS®, etc.) may include the navigation data models native to the computer browser mechanisms or provided by the computer operation systems. The painter for a mobile device uses, however, the navigation data models native to or provided by the mobile device operation systems. In these embodiments illustrated by this example, the painters will extract only the data models that are needed or desired to represent the content of a webpage but not the data models that include or are associated with the navigation of the mobile application installed on a mobile device.

At 314, respective responses from the one or more painters may be identified at the control mechanism of the mobile application. For example, each painter being inquired may use its own communication mechanism to transmit its answer to the inquiry determined by the painter's decision mechanism to the control mechanism of the mobile application at 314 in some embodiments. At 316, a determination may be made to decide whether or not the respective responses obtained from the one or more painters include an affirmative response. That is, a determination may be made to decide whether or not one or more painters have responded that they can paint the screen with the screen description. At 318, a painter may be determined or selected from the one or more painters that respond affirmatively to the at least one inquiry. In some embodiments, the painter that first responds affirmatively will be selected as the painter at 318. In the alternative, all responses, affirmative or negative, from the one or more painters being inquired into will be gathered.

The painter may then be determined at 320 based in part or in whole upon the priorities, weights, or rankings of the painters that respond affirmatively. As described above, the priorities, rankings, or weights of painters may be determined based at least on, for example, the stage of the process flow for which the screen is to be displayed. In an example of an online tax return preparation and filing application, a table painter may have a higher priority than a summary painter at the beginning of the tax return preparation and filing process. On the other hand, the summary painter may have a higher priority near the end of a data collection session than a table painter or a "guide me" painter. The priorities, weights, or rankings may also be determined based in part upon the functionality or characteristics of the painters in one or more embodiments.

For example, a collection view painter, when inquired, may have a lower priority than a table painter, a "guide me" painter, a hint-based painter, or a summary painter because of the functionality or characteristics of the collection view painter. A collection view painter, as described above, may try to paint all or nearly all the data models (with the exceptions of, for example, the navigation related data models) of a webpage included in a screen description. The collection view painter may size (e.g., applying one or more reduction factors to one or more data models) and adjust (e.g., eliminating some spacers in the screen when needed or desired) some data models and attempt to lay out all the data models (with the exceptions of data models such as spacers that have been eliminated) based on the associations and/or controls for the data models. In some embodiments where the collection view painter is not inquired into, and the other painters inquired into do not respond affirmatively, the collection view painter may be selected as the painter for the single screen of interest, and the remaining determination is whether or not the screen produced by the collection view painter actually fits the display of a mobile communication device.

Once the layout is temporarily determined, the collection view painter may determine whether the boundary of the layout for the data models fits within the boundary of the mobile device display. In this manner, the collection view painter, as well as the other painters describe herein, generates a single screen for the webpage on different displays of mobile devices having different screen sizes and resolutions. The collection view painter may then store the aforementioned processing results at least temporarily in a volatile memory (e.g., random access memory in the mobile device) when the layout fits within the mobile device display, in case the collection view painter is subsequent selected to paint the screen. On the other hand, the collection view painter will respond negatively to the inquiry if the decision mechanism of the collection view painter determines that the generated layout of the screen is too large to fit within the mobile device display. Therefore, a collection view painter may almost always paint all the data models of a webpage although a collection view painter may paint a screen at a slower speed due to the amount of data models and/or the number of attributes or characteristics needed to be considered by a collection view painter.

At 322, the selected painter may identify the associations between data models and their respective controls from the screen description. In some embodiments, a screen description may include a data structure (e.g., a hierarchical tree structure, a tabular structure, etc.) that comprises the associations between data models and their respective controls including, for example, the styles (e.g., colors, fonts, sizes, margins, attributes such as identifiers, classes, etc.) applied to data models, the placement controls of data models within a screen, relationships with or relative to other data models, information about data binding, etc.

In some embodiments where there is no such association for a particular data model (e.g., an unbound data model that has no association information) such that the placement of the data model cannot be precisely determined, the mechanisms described herein may infer at least some association or controls for such a data model. For example, a label for a particular field or data model may not have any association or control in a JSON screen description such that the precise position of the label may not be directly determined from the association or control, the mechanisms determined herein may, for example, compare attributes or characteristics of the label at issue with attributes or characteristics of one or more other data models to infer such association or controls.

As a practical example, the control or association of a label providing a hint for an address entry field and including the text of "street", "apartment number", etc. may be determined by examining the text "Apartment Number", "Street Name", "Job Title", etc. with the attributes of the data models (e.g., the corresponding hint entries including text such as "At.", "Apt. No.", "manager", etc. provided for the fields respectively accepting an address and job title, etc.) to infer the controls or associations for the label such that the label may be placed in the right place in a screen to provide hints or suggestions for the data models.

At 324, the orientation of the mobile device may be determined. For example, the mechanisms described herein may work in conjunction with the accelerometer of a mobile device to determine whether the mobile device is in a portrait or landscape orientation. The orientation of the mobile device affects the width and length of the screen to be displayed and may thus be factored into consideration of a painter to paint the screen. At 326, a smaller subset of data models in the screen description, rather than all the data models in the screen description, may be identified in some embodiments. In these embodiments, the data models that represent the contents of the screen may be first identified, and other data models related to, for example, navigation, some spacers to create blank space, general information such as some graphical or textual data models for aesthetic or explanatory purposes, etc. may be optionally ignored in painting the screen for a mobile device display.

The smaller subset of the data models or the data models may be extracted at 328, and the mobile device display characteristics may be identified at 330. For example, the horizontal and/or vertical pixel counts of the mobile device display may be identified at 330 in one or more embodiments. The selected painter may then paint the screen with the identified data models or the smaller subset of data models based in part or in whole upon the identified associations, controls, and/or the detected orientation of the mobile device at 332. At 334, the mechanisms described herein may detect a change in the orientation of the mobile device.

For example, the described mechanisms may work in conjunction with the accelerometer of the mobile device to detect that the mobile device has changed from the portrait orientation to the landscape orientation, or vice versa at 334 in some embodiments. In some of these embodiments, the painter may repaint identified data models or the smaller subset thereof to repaint the screen at 336 according to the new orientation of the mobile device. In some other embodiments, the mechanisms described herein may simply rotate and present the screen in the new orientation without or without scaling the screen to reflect the change in the orientation of the mobile device.

Figure 4A:
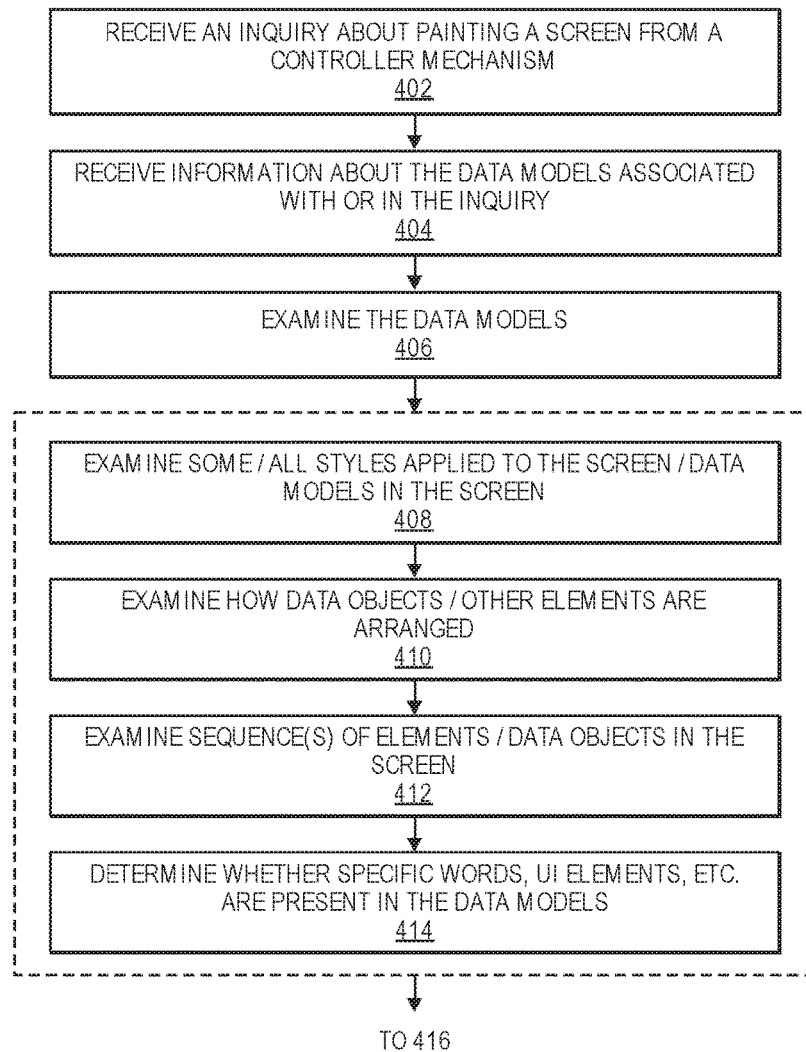
FIGS. 4A-B jointly illustrates a block diagram for a process for natively rendering and optimizing Internet contents on different displays of mobile devices with a priority list of painters in one or more embodiments.
Figure 4B:
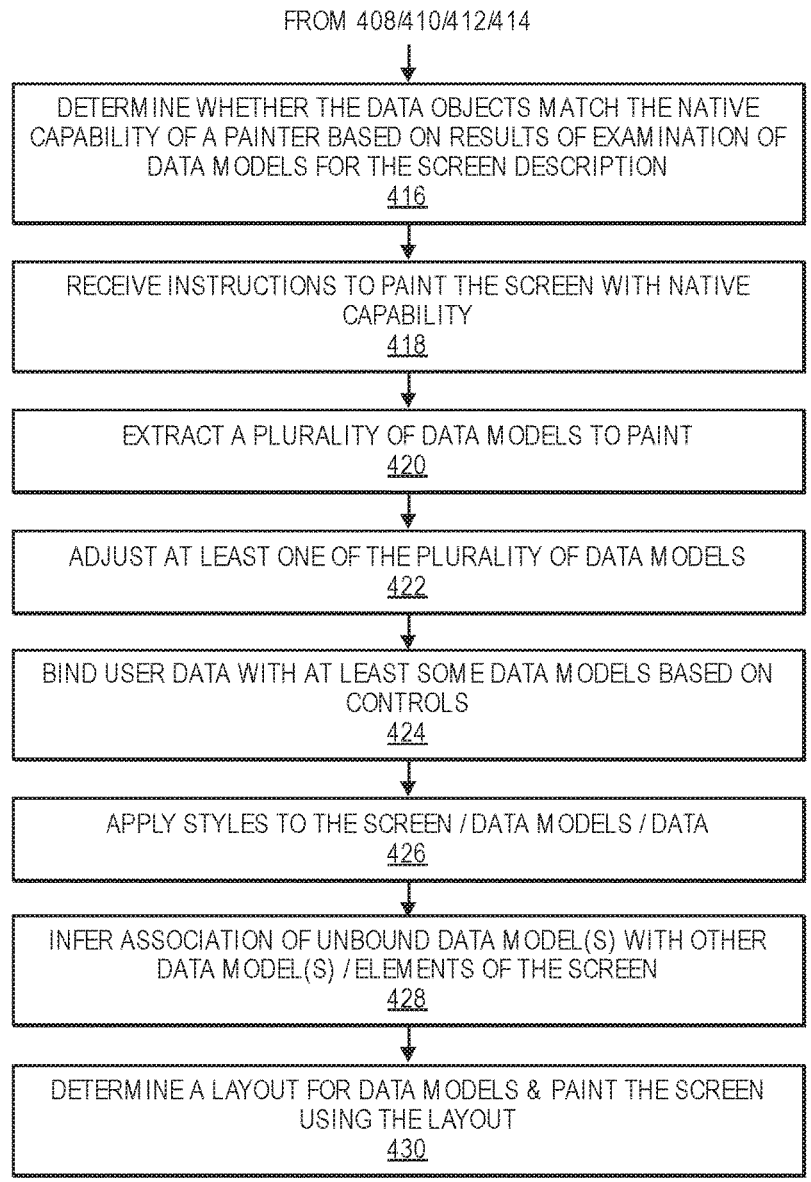

FIGS. 4A-B jointly illustrates a block diagram for a process for natively rendering and optimizing Internet contents on different displays of mobile devices with a priority list of painters in one or more embodiments. At 402, a painter on a mobile device may receive an inquiry about painting a screen from a controller mechanism such as the control logic of a mobile application. The painter may be a part of a mobile application and may further receive information about data models or the data models that are associated with or in the inquiry at 404. These data models, when rendered or painted on the mobile device display, jointly represent the webpage presented to users according to the screen description that is transmitted from a backend server powering the server hosting the webpage optimized for computer displays and received at the mobile device.

At 406, the painter receiving the inquiry may examine the received or extracted data models or the information about the received or extracted data models. Different painters may include different decision mechanisms to respond to the inquiry and thus may examiner different attributes or characteristics of the data models or the information therefor. For example, a painter may examine some or all styles applied to or how these styles are applied to the screen or the received or extracted data models in the screen to be painted at 408. The styles may include, for example, data types of data models such as arrays, tables, text, numbers, buttons associated with specific text, etc.

For example, a table painter may examine the received data models or the information therefor to determine whether the screen includes a table or array of elements to be painted. A painter may examine how data objects or other elements on a screen are arranged such as examining the associations and/or controls of data models at 410. For example, a table painter may examine the data models or information therefor to determine whether some data models (e.g., individuals' names, numbers, etc.) are arranged in a tabular format on a screen.

A painter may examine sequences of elements or data objects to be painted in the screen at 412. For example, a table painter may examine whether multiple data models (e.g., different income categories and the data bound to these categories) form sub-sections or sub-parts of a section (e.g., income). A painter may also examine the received data models or the information therefor to determine whether specific words, UI elements, etc. appear in one or more of these received data models at 414. For example, a "guide me" painter providing guidance to users through a process flow may examine the received data objects or information therefor to determine whether any UI button or text model includes the text "guide me" or the equivalents thereof.

At 416, the painter may determine whether examined attributes or characteristics of the data objects needed to be painted in a screen match the native capability or functionality of the painter based in part or in whole upon the results of examination of the received data models or information thereof for the screen description. For example, a table painter having the native capability or functionality of painting screens having data models arranged in tabular formats may determine whether the received data models or information thereof includes tabulated data models. A "guide me" painter having the native capability or functionality of painting screens providing step-by-step guidance or guidance for specific, user-identified topics may determine the received data models or information thereof includes a UI button having the words "guide me" or the equivalents.

A summary painter having the native capability or functionality of painting screens that bind user-specified data models (e.g., interest income, taxable income, etc.) to default data models (e.g., a subsection title of "income") may examine the received data models or information thereof to determine whether the data models or information includes such default data models, user specified data models, and the controls or associations thereof.

A hint painter having the native capability or functionality of painting screens that provide hints to users may examine the received data models or information thereof to determine whether these data models or information includes unbound data models (e.g., pop-up balloons, labels, etc.) At 418, the selected painter may receive instructions from, for example, the control mechanism of a mobile application to paint the screen in response to the screen description. At 420, the painter may then fetch or receive a plurality of data models, if the plurality of data models have not been sent to the painter.

At 422, the painter may optionally adjust at least one data model of the plurality of data models. For example, the painter may eliminate one or more spacers that are used to create blank space in a screen, re-size a data model to a larger or a smaller form factor, etc. At 424, user specified data (e.g., income data, deductions, etc. for a tax return) may be bound to some data models (e.g., entry fields for income, entry fields for deductions, etc.) At 426, the painter may apply the styles to the screen or the data models. The styles may include background colors, font typeface, font size, font color, etc. At 428, the painter may infer association of an unbound data model with one or more data models or elements to be painted in the screen in substantially similar or identical manners as those described for reference numeral 322 above. At 430, the painter may determine a layout for the received or extracted data models and paint the screen with the determined layout.

Figure 4C:
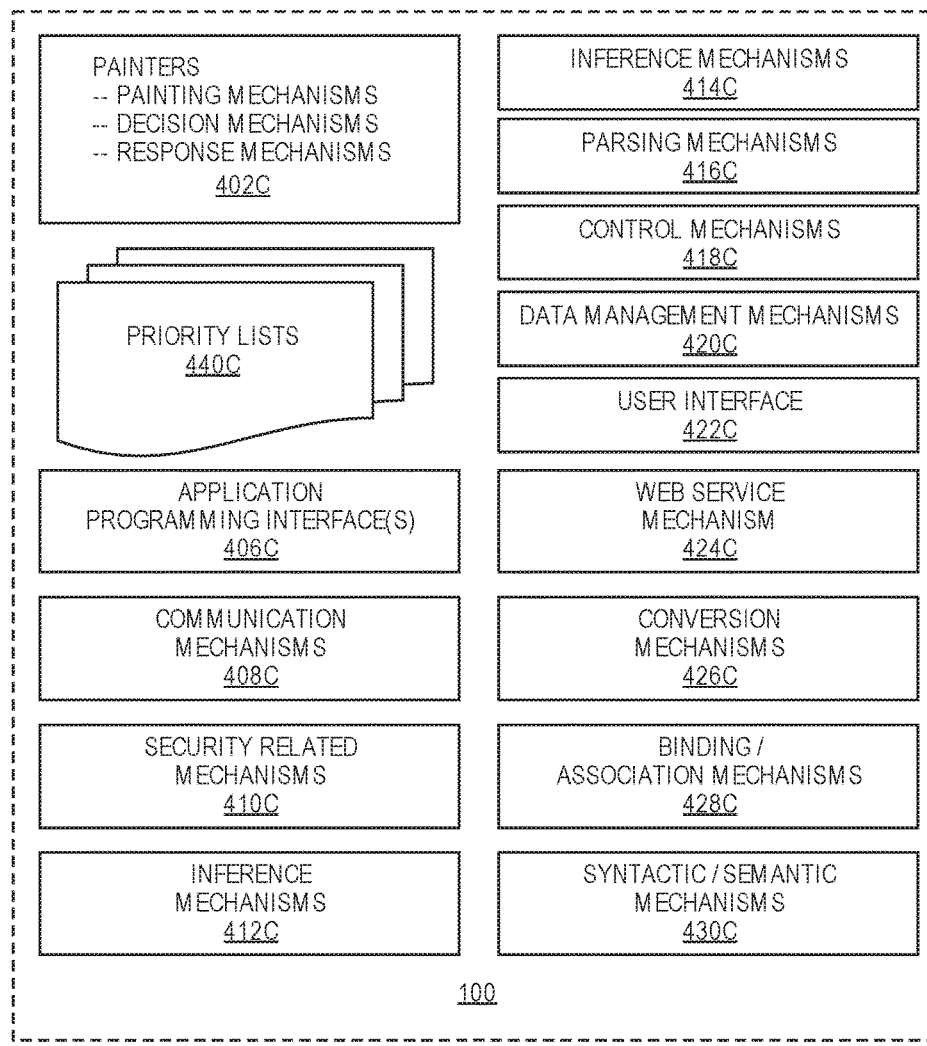
FIG. 4C illustrates a block diagram of the components of a mobile application for natively rendering and optimizing Internet contents on different displays of mobile devices in one or more embodiments.

FIG. 4C illustrates a block diagram of the components of a mobile application for natively rendering and optimizing Internet contents on different displays of mobile devices in one or more embodiments. In some of these embodiments, FIG. 4C illustrates some of the mechanisms of a mobile application. These mechanisms may include a plurality of painters 402C including the respective painting mechanisms each having its own decision mechanism and response mechanism to respond to inquiries. These painters may be stored in one or more priority lists 404C, which may or may not include respective orders, rankings, weights, or priorities for the painters, and one or more application programming interfaces 406C to interact with other part of the mobile device, one or more servers, or Web services.

These mechanisms may also include one or more communication mechanisms 408C including, for example, an email communication mechanism, a messaging mechanism, a notification mechanism providing notices to users, or any combinations thereof. Security related mechanisms 410C (e.g., an identification mechanism, an authentication mechanism, an authorization mechanism, a biometric scanning mechanism) may also be included in or invoked by the mobile application. For unbound data models, one or more inference mechanisms 412C may also be included in a mobile application to infer associations or controls for these unbound data models.

A mobile may also include or invoke the input/output (I/O) mechanisms 414C including, for example, a physical and/or virtual keyboard, a microphone for voice input, a screen with touch capability, etc. The mobile application may also include or invoke one or more parsing mechanisms 416C to parse data or information (e.g., received screen description) to aid its understanding or identification of certain data or information. The mobile application may also include or work in conjunction with one or more data management mechanisms 420C to fetch, receive, or transmit data or information among various components of the mobile device upon which the mobile application is installed and/or one or more servers (e.g., the backend server 106 and/or the first server 108 of FIG. 1).

A mobile application may include one or more Web service mechanisms 424C to interact with Web service servers. One or more conversion mechanisms 426C may also be included in a mobile application for language translation, speech processing (e.g., speech recognition for data input or user interactions). One or more binding or association mechanisms 428C may also be included in a mobile application to bind data values to data models or to associate controls with data models. A mobile application may also include a syntactic or a semantic mechanism 430C to aid the mobile application understand, for example, content of some information or data (e.g., screen description sent from a backend server).

Figure 5A:
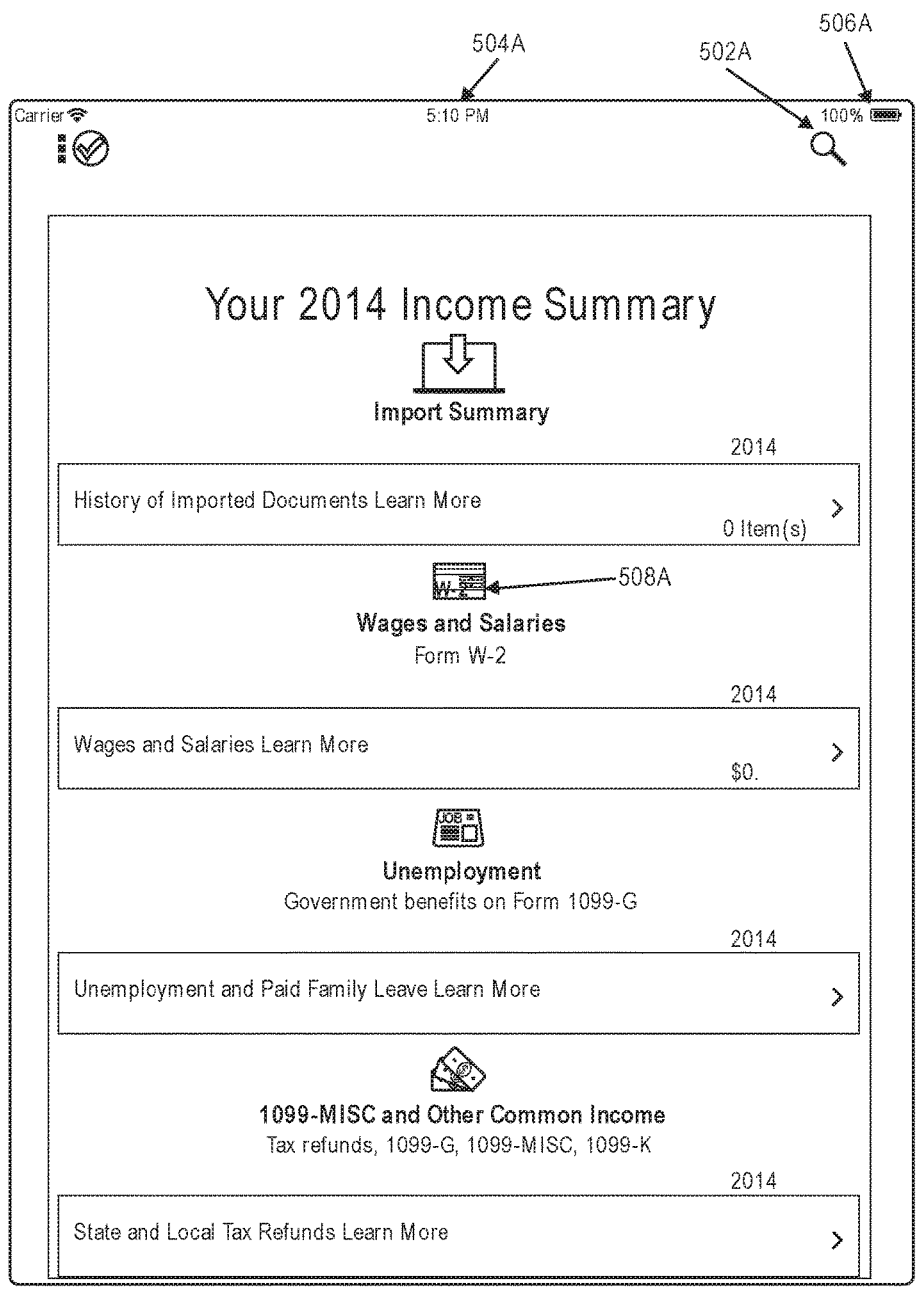
FIGS. 5A-B illustrate two screens of a first webpage painted by the same first painter for two different mobile devices having different screen sizes or resolutions in one or more embodiments.
Figure 5B:
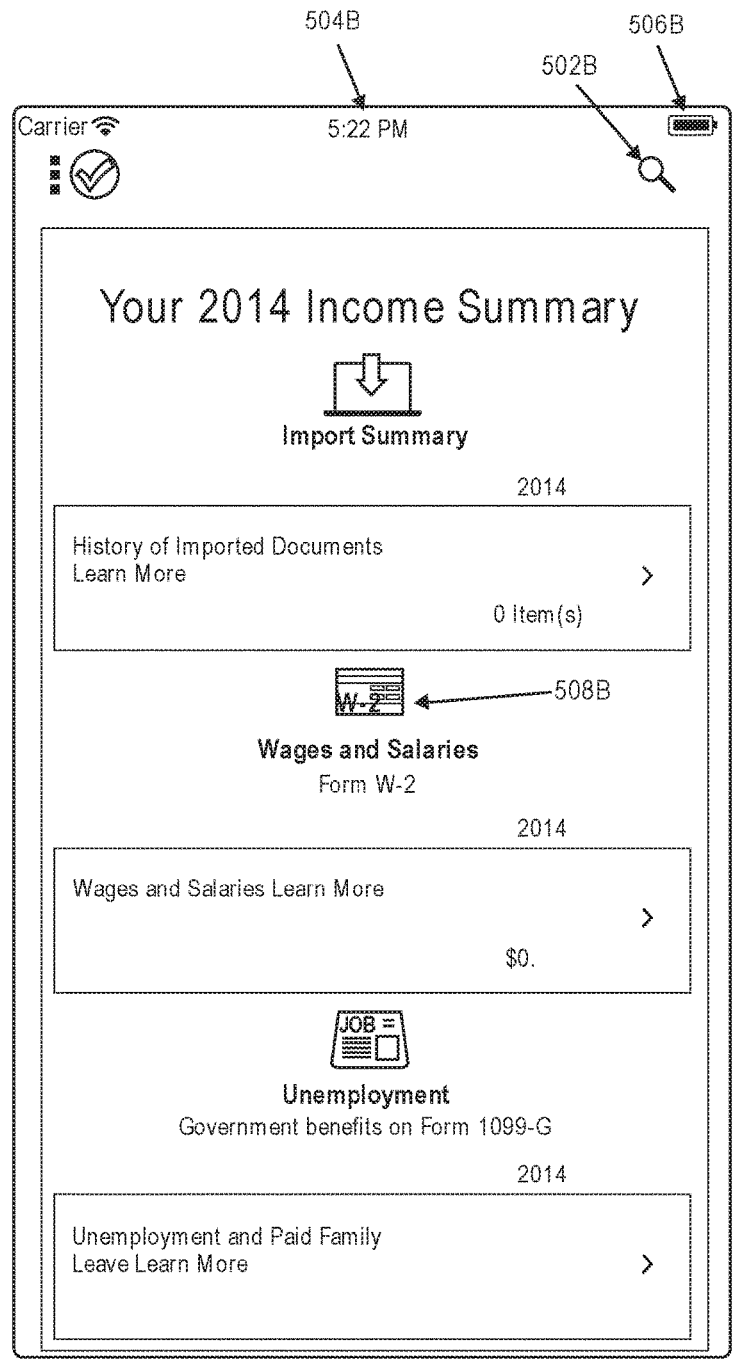

FIGS. 5A-B illustrate two screens of a first webpage painted by the same first painter for two different mobile devices having different screen sizes or resolutions in one or more embodiments. More specifically, FIG. 5A illustrates a table screen including tabulated data models and painted by a table screen painter for an Apple iPad running iOS mobile operating system. FIG. 5B illustrates another table screen painted by the same table screen painter for an Apple iPhone running the iOS mobile operating system. It shall be noted that the same table screen painter paints the two single table screens with some provided UI elements (e.g., the search UI elements 502A and 502B, the clock UI elements 504A and 504B, and the battery information UI element 506A and 506B) to fit the differently sized displays of a tablet computer and a smartphone although these two displays have different screen sizes and resolutions.

It shall be further noted that the UI elements painted by the table screen painter may include the UI elements provided by, for example, the operating system provider, some UI elements modified from the operating system provider provided UI elements, or custom UI elements completely different from the provided UI elements. In addition, FIGS. 5A-B illustrate some graphic data models (e.g., 508A and 508B) for the same "Wages and Salaries" data model with different size or form factor reduction factors for an optimized or nearly optimized display of these two graphic data models in these two different mobile device displays in some embodiments. In some other embodiments, the graphic data model of the same size or form factor may be used for the painted screens on the displays having different sizes or resolutions.

Figure 5C:
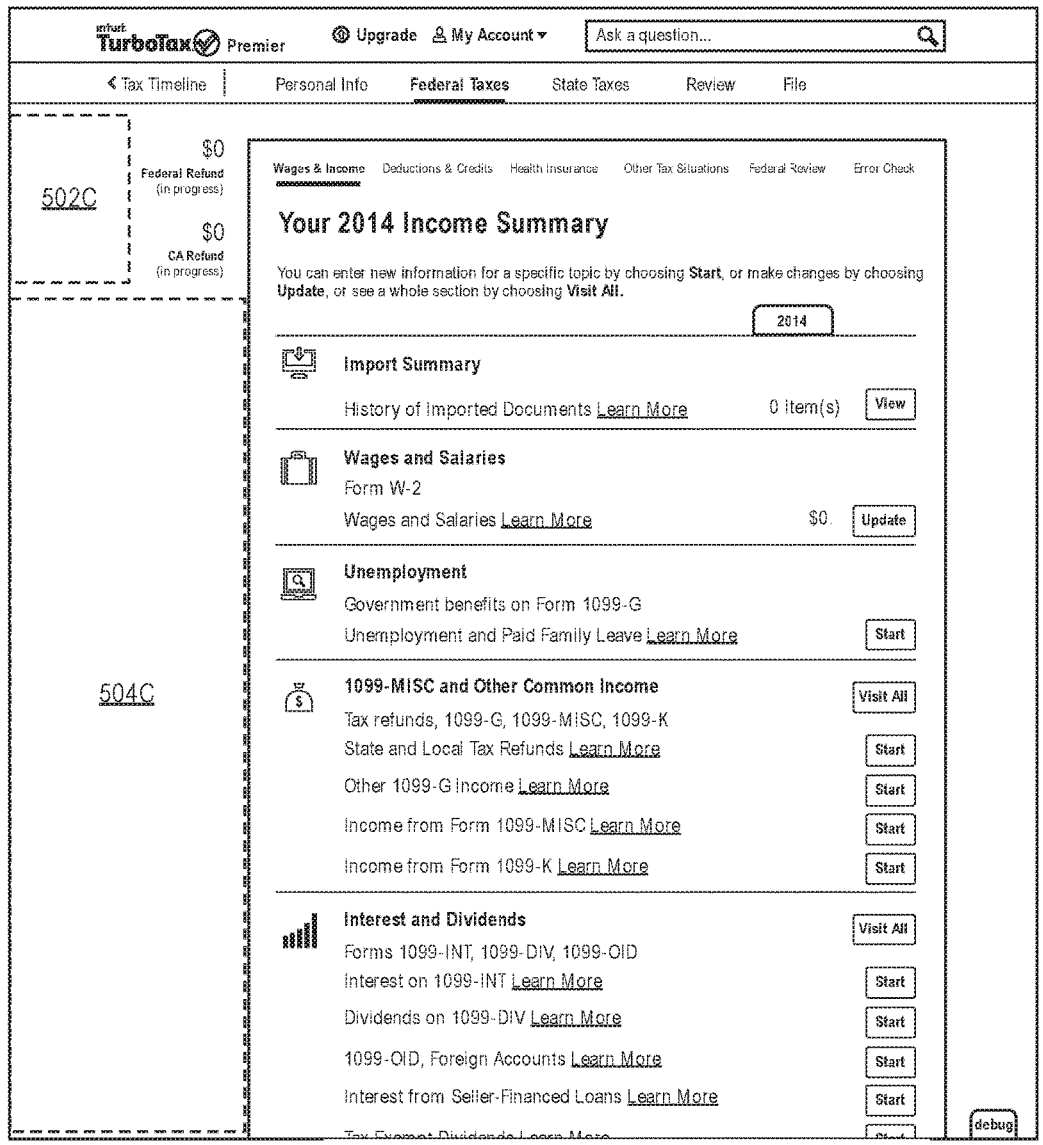
FIG. 5C illustrates the first web view screen for the same first webpage in one or more embodiments.

Furthermore, the two painted screens by the same table screen painter appear to include slightly different content. For example, the table screen illustrated in FIG. 5A includes the additional "1099-MISC and Other Common Income" and "State and Local Tax Refunds" that are absent in the painted screen illustrated in FIG. 5B. The absence of these data models in the painted screen of FIG. 5B may be due to the absence of user entered data for this particular category in view of the more limited screen area of the mobile device for FIG. 5B. FIG. 5C illustrates the first web view screen for the same first webpage displayed in a computer display in one or more embodiments. The reference webpage illustrated in FIG. 5C as well as the painted screens illustrated in FIGS. 5A-B are determined from the same screen description (e.g., a JSON screen definition) with the same set of data models.

The webpage as is generally seen on a computer display illustrated in FIG. 5C includes more data models whose presence in FIG. 5C does not indicate that the painted screens inadvertently omit some important information. Rather, the absence in FIGS. 5A-B of certain data models that are shown in FIG. 5C may indicate that there is not user specified data bound to these data models, or that these additional data models are presented in FIG. 5C for a more complete representation of various sub-sections or data models due to the more ample display area of a computer display.

FIG. 5C further illustrates additional spacer data models (e.g., 502C and 504C) that may be eliminated by the table screen painter for the mobile device displays due to the limitations on the sizes of the mobile device displays. The navigation UI elements in FIG. 5C are also not painted in FIGS. 5A-B because the painters may use the navigation UI elements provided by the mobile operating system and thus do not paint the data models of these navigation UI elements provided for computer displays. The search field is also expanded in FIG. 5C, whereas the search fields in FIGS. 5A-B are represented as two magnification glass icons.

Figure 6A:
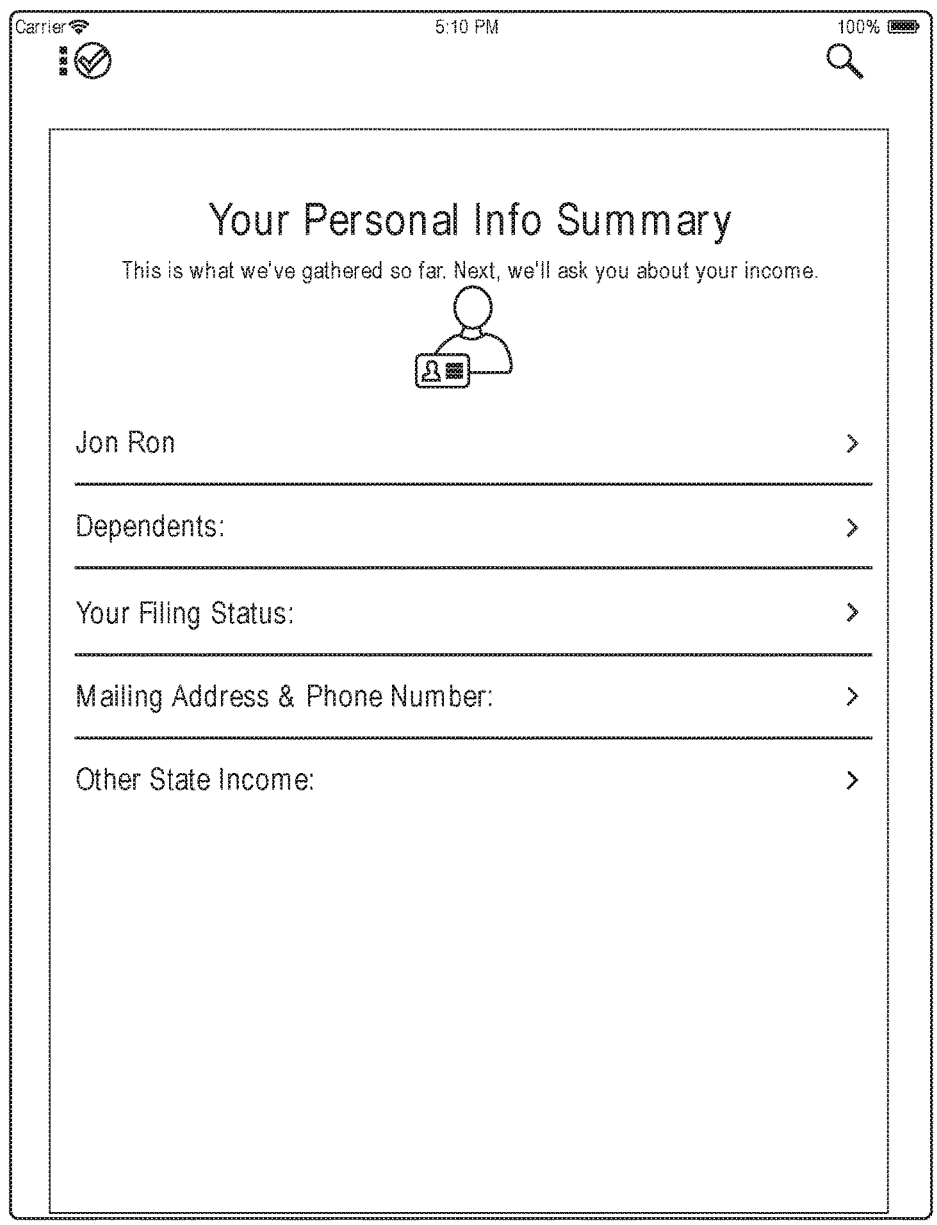
FIGS. 6A-B illustrate two screens of a second webpage painted by the same second painter for two different mobile devices having different screen sizes or resolutions in one or more embodiments.
Figure 6B:
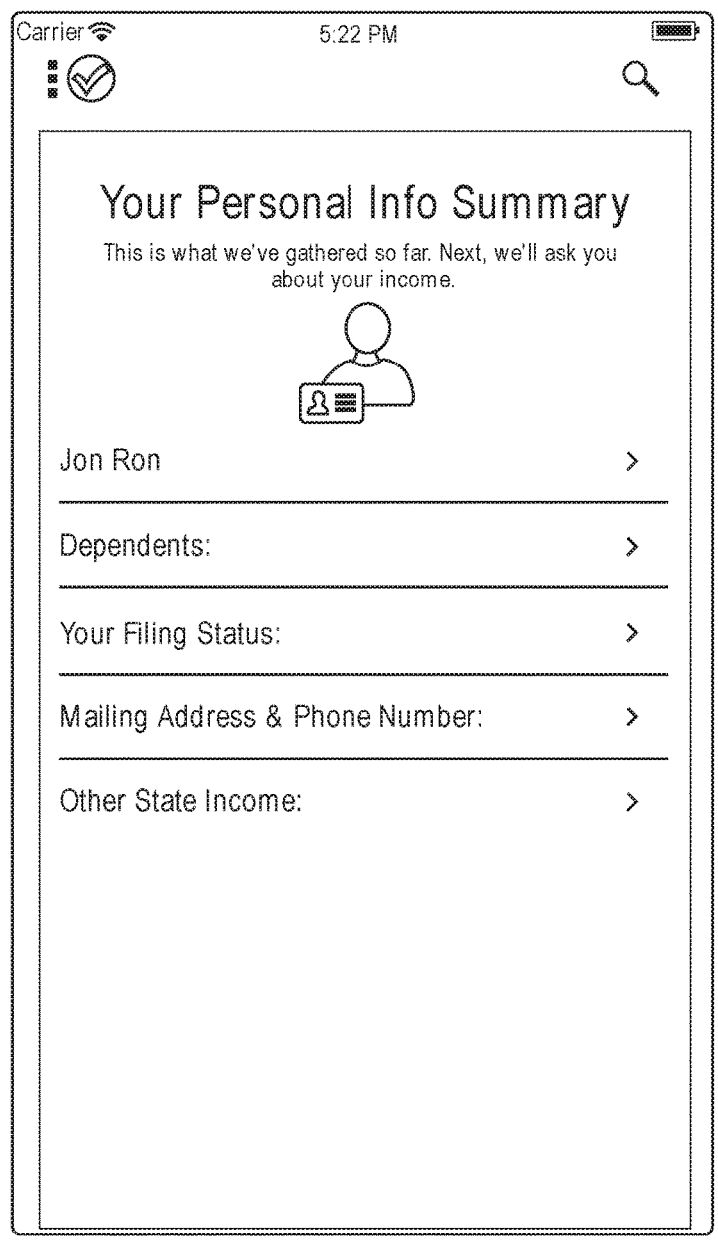

FIGS. 6A-B illustrate two screens of a second webpage painted by the same second painter for two different mobile devices having different screen sizes or resolutions in one or more embodiments. More specifically, FIG. 6A illustrates a summary screen including user entered data (e.g., Jon Ron) bound to data models (e.g., Name, Dependents, Your Filing Status, etc.) and painted by a summary screen painter for an Apple iPad running iOS mobile operating system. FIG. 6B illustrates another summary screen painted by the same summary screen painter for an Apple iPhone running the iOS mobile operating system.

Figure 6C:
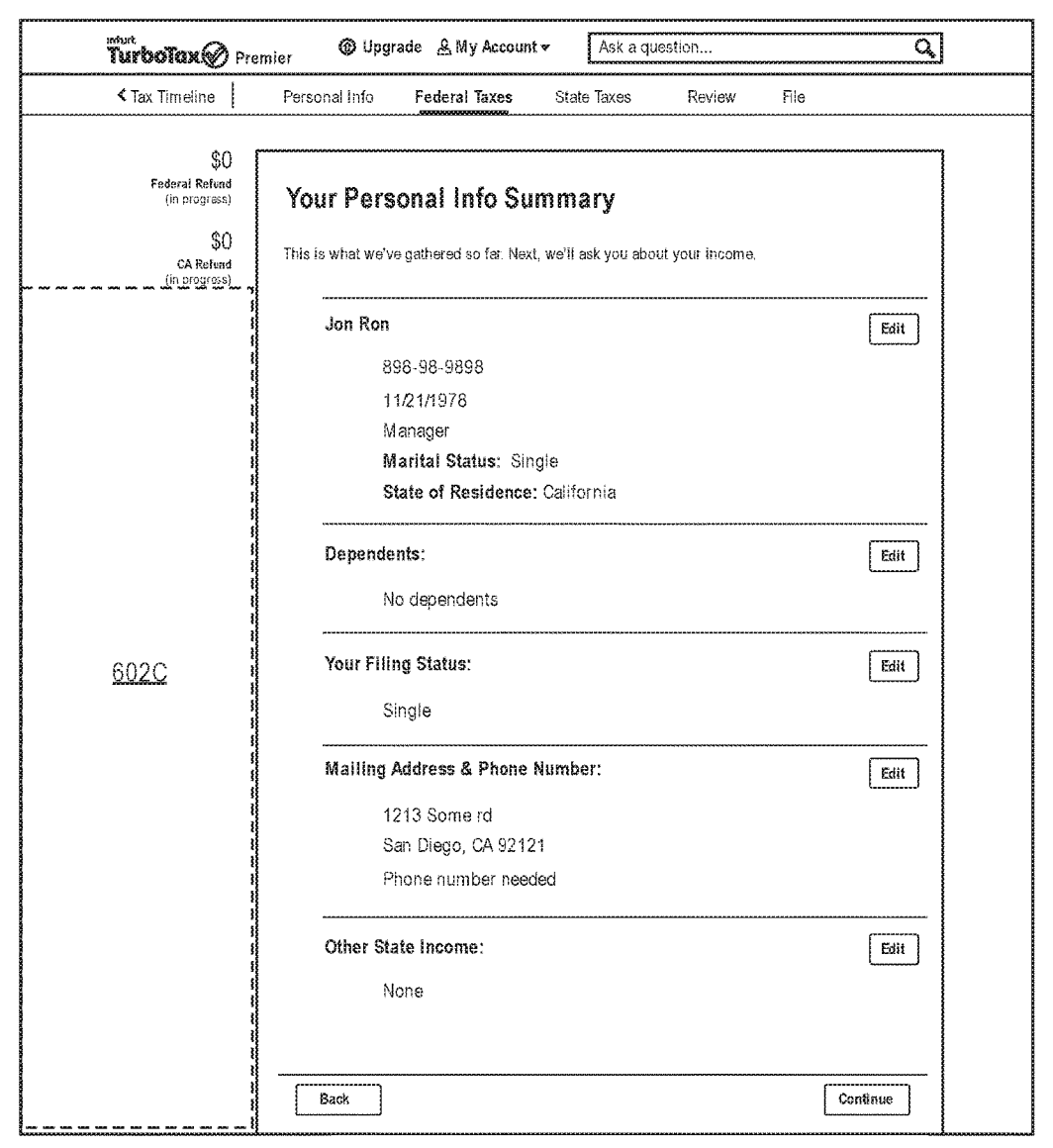

Some of the user entered data (e.g., "No dependents", "Single", actual mailing address, etc. as illustrated in FIG. 6C) are not present in the painted screens and may be displayed in FIGS. 6A-B by touching the expansion icon (">") on screen as a design choice or as limited by the sizes of the mobile device displays. In some other embodiments, the painted screen may also bind and display the user entered data in the painted screens illustrated in FIGS. 6A-B. FIG. 6C illustrates the reference second web view screen displayed in a computer display for the same second webpage with the same screen description and the same set of data models (although certain data models may not be shown in FIGS. 6A-B) in one or more embodiments. FIG. 6C further includes some spacer elements (e.g., 602C) that may be eliminated in FIGS. 6A-B.

Figure 7A:
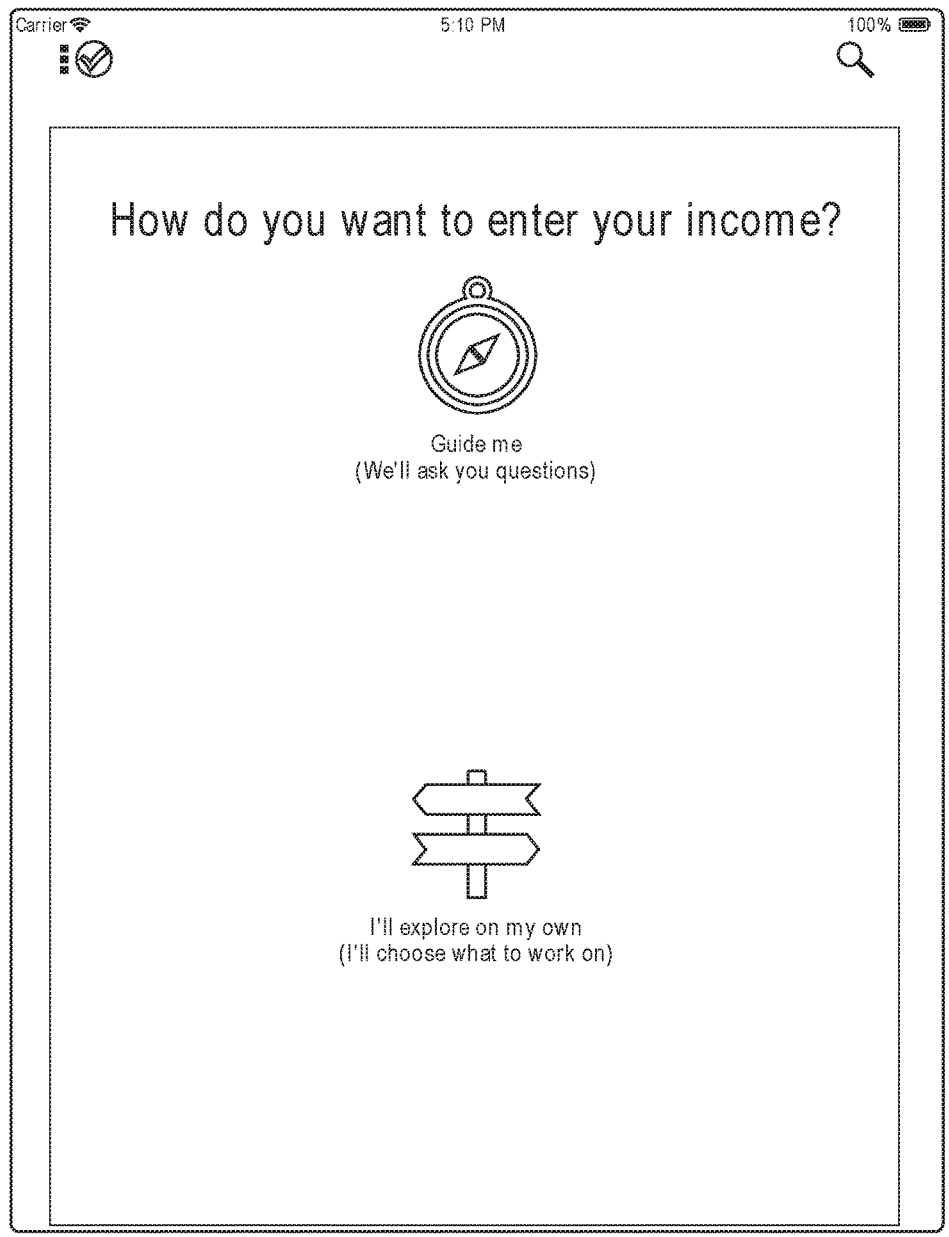
FIGS. 7A-B illustrate two screens of a third webpage painted by the same third painter for two different mobile devices having different screen sizes or resolutions in one or more embodiments.
Figure 7B:
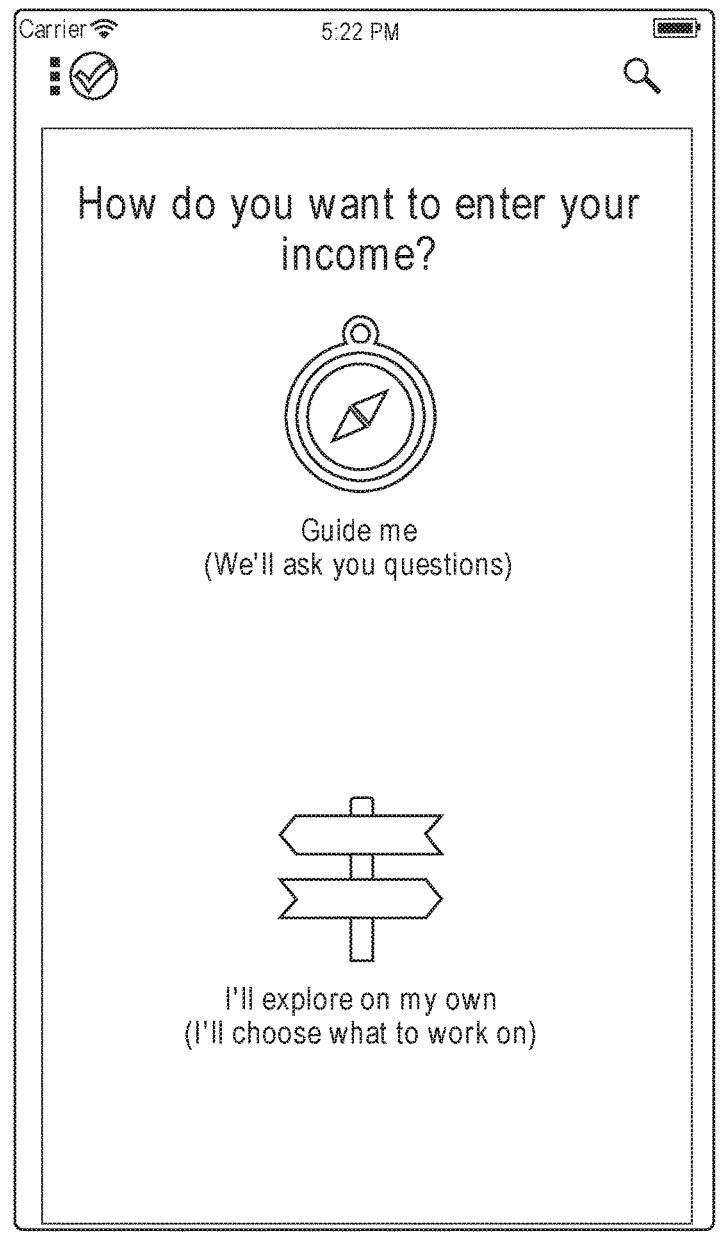

FIGS. 7A-B illustrate two screens of a third webpage painted by the same third painter for two different mobile devices having different screen sizes or resolutions in one or more embodiments. More specifically, FIG. 7A illustrates a "guide me" screen including tabulated data models and painted by a "guide me" screen painter for an Apple iPad running iOS mobile operating system. FIG. 7B illustrates another "guide me" screen painted by the same "guide me" screen painter for an Apple iPhone running the iOS mobile operating system. The sizes or form factors of the graphic and/or textual data models in these two painted screens may have been adjusted for an optimized display of these data models in substantially similar or identical manners as those described with reference to FIGS. 5A-B above.

Figure 7C:
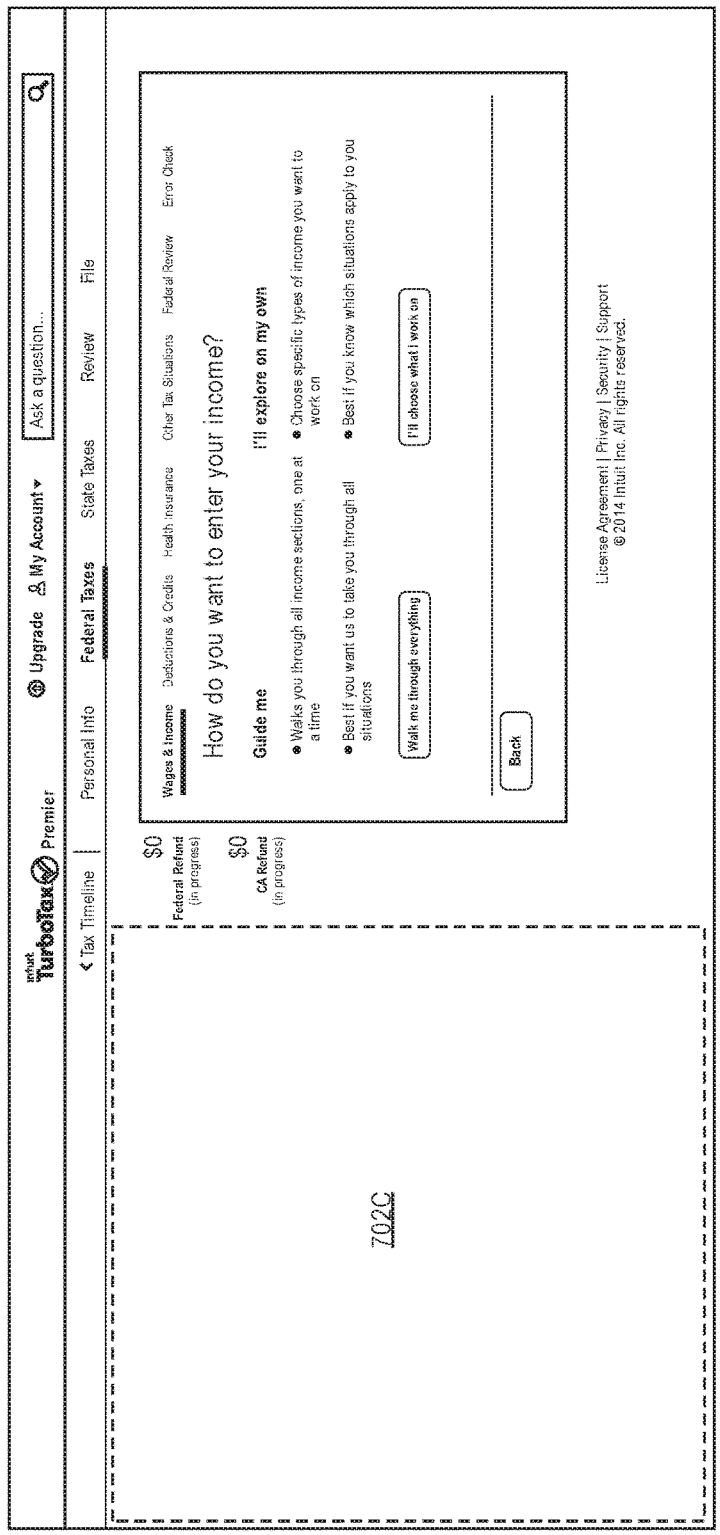
FIG. 7C illustrates the third web view screen for the same third webpage in one or more embodiments.

The "guide me" painter may examine the words "Guide me" or "explore" in, for example, the screen description of the data models bound to the graphic elements and use its own decision mechanism to determine that the "guide me" painter does have the native capability or functionality to paint these two screens. FIG. 7C illustrates the reference third web view screen for the "guide me" webpage displayed in a computer display for the same third webpage with the same screen description and the same set of data models (although certain data models may not be shown in FIGS. 7A-B) in one or more embodiments. FIG. 7C further includes some spacer elements (e.g., 702C) that may be eliminated in FIGS. 7A-B.

Figure 8A:
FIG. 8A illustrates a screen of a fourth webpage painted by a fourth painter on a display of a mobile device in one or more embodiments.
Figure 8B:
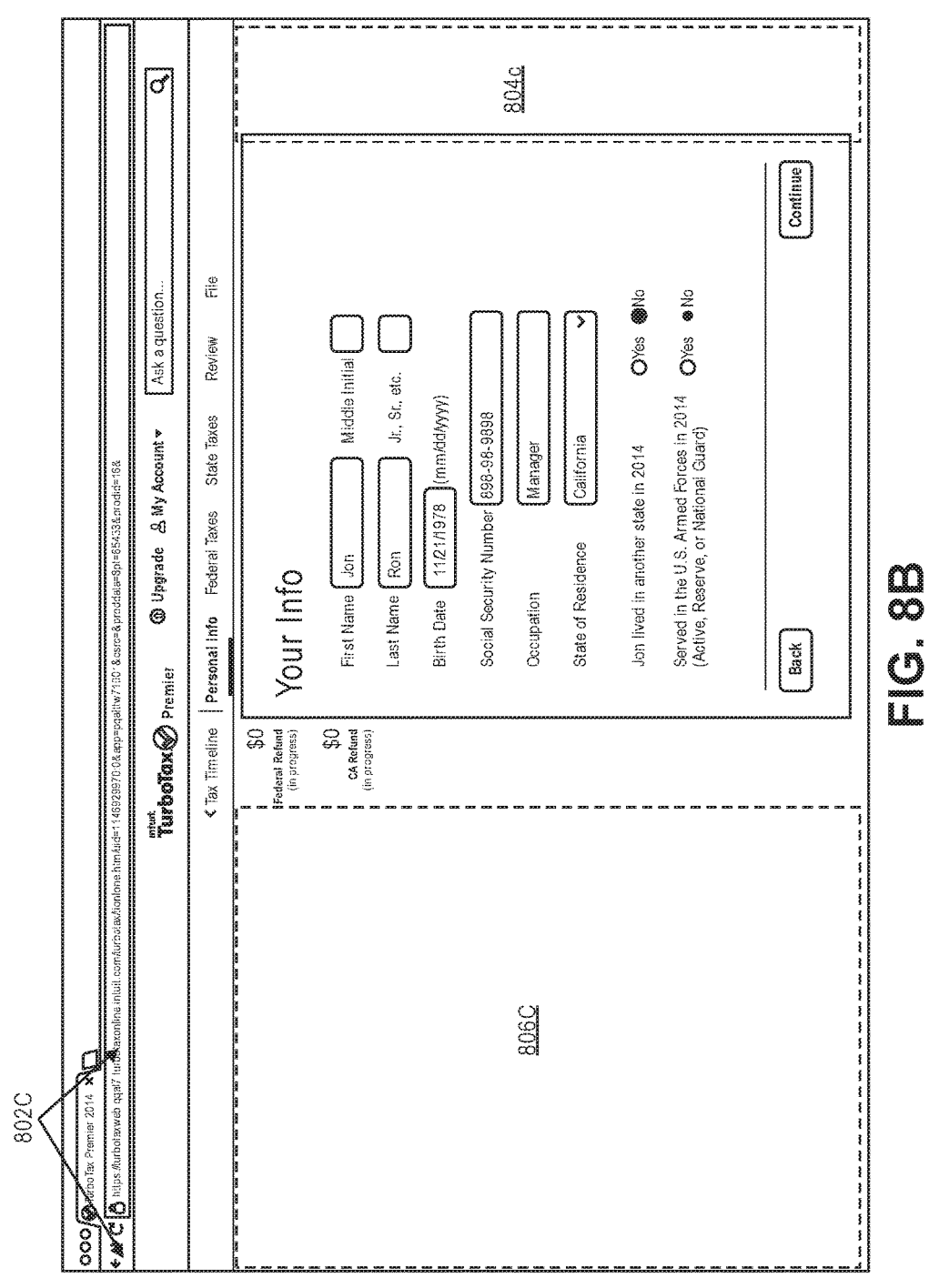

FIG. 8A illustrates a screen of a fourth webpage painted by a fourth painter on a display of a mobile device in one or more embodiments. More specifically, FIG. 8A illustrates a collection view painted by displayed on a mobile device display by using a collection view screen painter. FIG. 8B illustrates the fourth web view screen for the same fourth webpage in one or more embodiments. As it can be seen from FIGS. 8A-B, the collection view screen painter attempts to paint all or most of the data models in the screen description, with one or more exceptions such as the navigation UI elements 802C and some spacer data models (e.g., 804C and 806C). As a result of the collection view screen painter's attempt to paint most of the data models in the received screen description, the collection view illustrated in FIG. 8A appears to be substantially similar to the webpage displayed on a computer display illustrated in FIG. 8B.

Figure 9A:
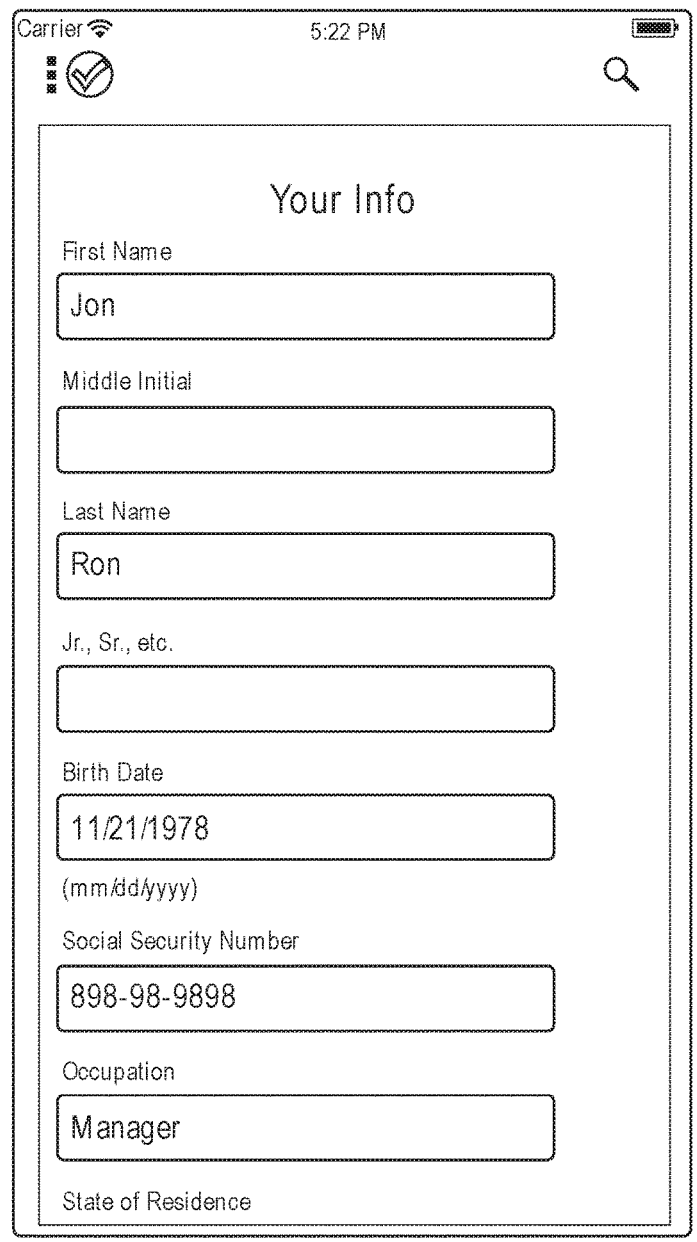
FIG. 9A illustrates a screen of a fifth webpage painted by a fifth painter on a display of a mobile device in one or more embodiments.
Figure 9B:
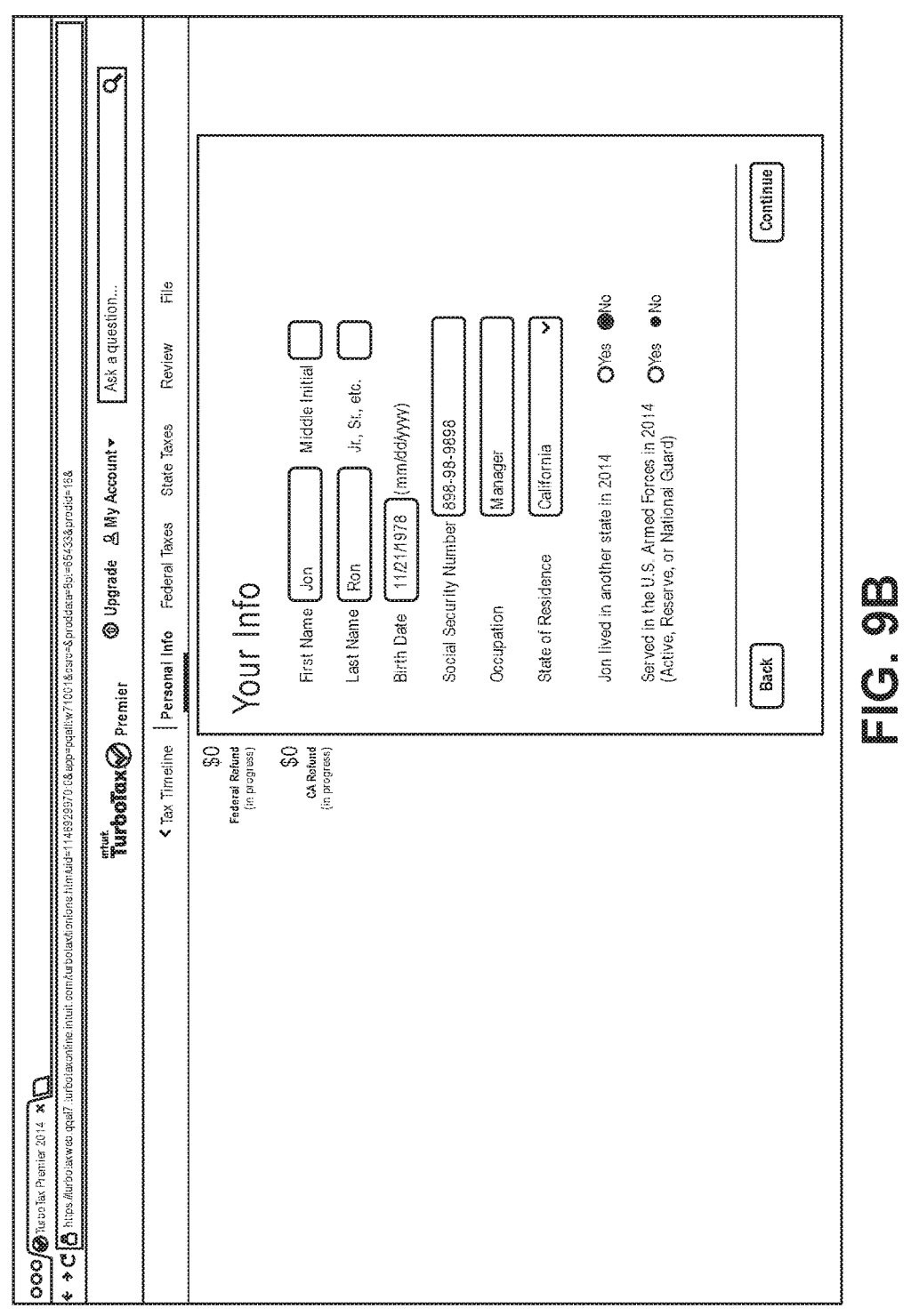

FIG. 9A illustrates a screen of a fifth webpage painted by a fifth painter on a display of a mobile device in one or more embodiments. More specifically, FIG. 9A illustrates a hint-based screen painted by a hint-based screen painter that may examine the label (e.g., "11/21/1978" or "Manager") and the data model (e.g., "Birth Date" and "Occupation") in the screen description to infer the association between the label and the data model based in part upon, for example, the semantics of these attributes or text. FIG. 9B illustrates the fifth web view screen for the same fifth webpage in one or more embodiments. As it can be seen from FIGS. 9A-B, some spacers are also eliminated in painting the hint-based screen of FIG. 9A.

Figure 10:
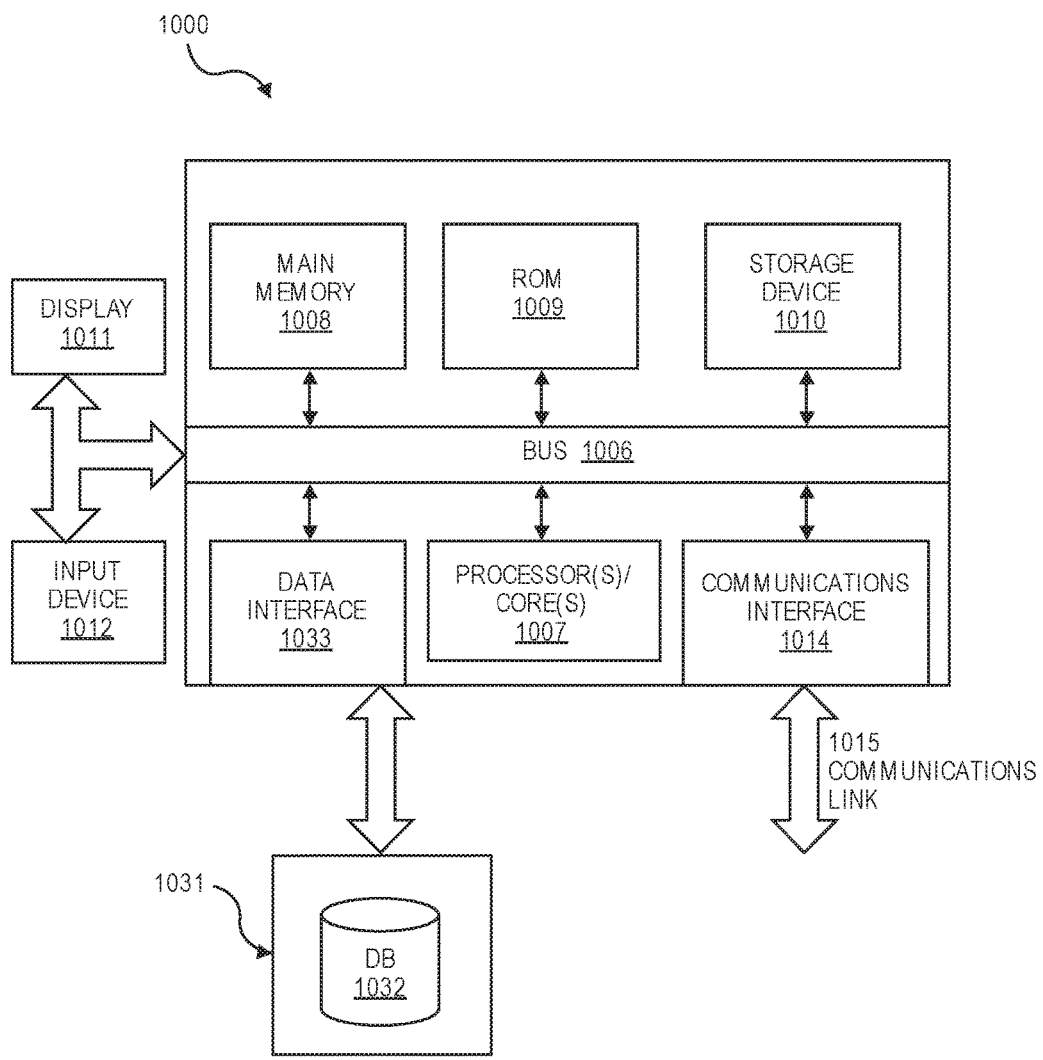
FIG. 10 illustrates a block diagram of an illustrative computing system suitable for implementing various embodiments and mechanisms described herein.

Referring to FIG. 10, a block diagram of components of an illustrative computing system 1000 suitable for implementing various embodiment of the invention is illustrated. For example, the exemplary computing system 1000 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1000 includes a bus 1006 or other communication mechanism for communicating information, which interconnects subsystems and devices, such as processor 1007, system memory 1008 (e.g., RAM), static storage device 909 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control (not shown).

According to one embodiment of the invention, computer system 1000 performs specific operations by one or more processors or processor cores 1007 executing one or more sequences of one or more instructions contained in system memory 1008. Such instructions may be read into system memory 1008 from another computer readable/usable storage medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 1007 may be used to perform various actions such as various actions, processes, or modules involving determining, analyzing, performing actions, etc. In some embodiments, at least one of the one or more processors or processor cores 1007 has the multithreading capability.

In one embodiment, the term "logic" shall mean any combination of software or hardware that is used to implement all or part of the invention. In the single embodiment or in some embodiments, the one or more processors or processor cores 1007 may be used to perform various acts such as various acts involving determining, analyzing, performing actions, etc. In some embodiments, at least one of the one or more processors or processor cores 1007 has the multithreading capability to execute a plurality of threads to perform various tasks as described in the preceding sections.

Various actions as described in the preceding paragraphs may be performed by using one or more processors, one or more processor cores, or combination thereof 1007. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 1000 coupled by communication link 1015 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. In an embodiment, the computer system 1000 operates in conjunction with a data storage system 1031, e.g., a data storage system 1031 that contains a database 1032 that is readily accessible by the computer system 1000. The computer system 1000 communicates with the data storage system 1031 through a data interface 1033. A data interface 933, which is coupled to the bus 1006, transmits and receives electrical, electromagnetic or optical signals that include data streams representing various types of signal information, e.g., instructions, messages and data. In embodiments of the invention, the functions of the data interface 1033 may be performed by the communication interface 1014.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

It shall also be noted that although various examples described or drawings illustrated herein refer to a merchant's pairing a connected device (e.g., a cellular phone) with a wireless peripheral (e.g., a wireless transaction card reader), various aspects described apply with full and equal effects to any users who are pairing their connected devices to various types of wireless peripherals. Therefore, the reference to a merchant or a wireless transaction card reader are not intended to and shall not be interpreted as limiting the scope of the application or the scope of the claims, unless otherwise specifically recited or claimed.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A machine implemented method for natively painting Internet contents on different displays of mobile communication devices, the method being performed by at least a mobile communication device including a plurality of painter applications and comprising:

receiving, by a mobile communication device, a description of a screen from a backend service server, wherein the backend service server is in communication with a first server hosting a software application which the mobile communication device attempts to access, and the software application comprises a tax return preparation software application;

identifying, by the mobile communication device, a plurality of data models for the screen by extracting the plurality of data models from the description;

generating, by the mobile communication device, at least one inquiry of whether a first painter application receiving the at least one inquiry has native capability to paint the screen based at least in part upon the description;

communicating the at least one inquiry to at least a second painter application of the plurality of painter applications;

at least the second painter application receiving the at least one inquiry and generating respective responses to the at least one inquiry, wherein a communication of the at least one inquiry to a third painter application is skipped based at least in part upon the respective responses of at least the second painter application;

selecting a painter application from the plurality of painter applications, wherein the painter application that has been selected is not the third painter application; and painting the screen by transforming at least one data model of the plurality of models into content of the screen by the painter application that has been selected.

2. The machine implemented method of claim 1, wherein the plurality of painter applications are associated with a priority list of painter applications and comprise respective decision code modules that are used to generate the respective responses to the at least one inquiry.

3. The machine implemented method of claim 1, wherein the plurality of painter applications are invoked on a one-by-one basis or in an all-at-once manner.

4. The machine implemented method of claim 1, wherein the mobile communication device further comprises:

a control code module configured to transmit the at least one inquiry to the one or more painter applications of the plurality painter applications;

the control code module configured to receive the respective responses generated by at least one or more decision code modules of the one or more painter application of the plurality of painter applications; and the control code module configured to select the painter application based in part or in whole upon the respective responses.

5. The machine implemented method of claim 4, wherein the painter application, which has been selected, is the painter application that responded earliest to the transmitted at least one inquiry.

6. The machine implemented method of claim 4, wherein the control code module gathers the respective responses from the one or more painter applications and selects the painter application, which has been selected, by using a voting algorithm or a weighted algorithm.

7. The machine implemented method of claim 1, the plurality of painter applications further includes:

a fourth painter application configured to paint the plurality of data models by generating and storing a layout for displaying the plurality of data models in a volatile memory; and the fourth painter application further configured to check a boundary of the layout against a boundary of a display of the mobile communication device.

8. The machine implemented method of claim 7, further comprising:

selecting the fourth painter application to paint the screen, wherein the one or more painter applications of the plurality of painter applications respond negatively to the at least one inquiry based in part or in whole upon a result of the fourth painter application checking the boundary of the layout against the boundary of the display of the mobile communication device.

9. The machine implemented method of claim 7, further comprising:
selecting a web view screen painter application to paint the screen, where the one or more painter application of the plurality of painter applications respond negatively to the at least one inquiry based in part or in whole upon a result of the second painter application checking the boundary of the layout against the boundary of the display of the mobile communication device.

10. The machine implemented method of claim 1, further comprising:
detecting a change in an orientation of a display of the mobile communication device using at least an accelerometer in the mobile communication device; and
repainting the screen by the painter application that has been selected by transforming the at least one of the one or more data models into content of the screen based in part upon the change in the orientation of the display of the mobile communication device.

11. A mobile communications device comprising a processor and a wireless communications chip, wherein the processor is further configured to perform the steps of:
receiving a description of a screen from a backend service server, wherein the backend service server is in communication with a first server hosting a software application which the mobile communication device attempts to access, and the software application comprises a tax return preparation software application;
identifying, by the mobile communication device, a plurality of data models for the screen by extracting the plurality of data models from the description;
generating, by the mobile communication device, at least one inquiry of whether a second painter application receiving the at least one inquiry has native capability to paint the screen based at least in part upon the description;
communicating the at least one inquiry to at least the second painter application of the plurality of painter applications;
at least the second painter application receiving the at least one inquiry and generating respective responses to the at least one inquiry, wherein a communication of the at least one inquiry to a third painter application is skipped based at least in part upon the respective responses of the second painter;
selecting a painter application from the plurality of painter applications, wherein the painter application that has been selected is not the third painter application; and
painting the screen by transforming at least one data model of the plurality of data models into content of the screen by the painter application that has been selected.

12. The system of claim 11, wherein the mobile communication device further comprises:
a control code module configured to communicate the at least one inquiry to the plurality of painter applications excluding the third painter application;
the control code module further configured to receive the respective responses generated by at least one or more decision code modules of the plurality of-painter applications; and
the control code module further configured to select the painter application based in part or in whole upon the respective responses.

13. The system of claim 11, the plurality of painter applications further includes:
a fourth painter application configured to paint the plurality of data models by generating and storing a layout for displaying the plurality of data models in a volatile memory; and
the fourth painter application further configured to check a boundary of the layout against a boundary of a display of the mobile communication device.

14. The system of claim 13, further comprising a logic code modules configured to select the third painter application to paint the screen, wherein one or more painter applications of the plurality of painter applications respond negatively to the at least one inquiry based in part or in whole upon a result of the fourth painter application checking the boundary of the layout against the boundary of the display of the mobile communication device.

15. The system of claim 13, further comprising: a logic code modules configured to select a web view screen painter application to paint the screen, where one or more painter application of the plurality of painter applications respond negatively to the at least one inquiry based in part or in whole upon a result of the fourth painter application checking the boundary of the layout against the boundary of the display of the mobile communication device.

16. The system of claim 11, further comprising: a logic code modules configured to detect a change in an orientation of a display of the mobile communication device using at least an accelerometer in the mobile communication device; and
A control code module configured to repaint the screen with the painter application, which has been selected, by transforming at least one data model of the plurality of data models into the content of the screen based at least in part upon the change in the orientation of the display of the mobile communication device.

17. A computer program product comprising a non-transitory machine readable storage medium having stored thereupon a mobile application which, when executed by a mobile communication device, causes the mobile communication device to perform a set of acts for natively rendering Internet contents on different displays of mobile communication devices, the process being performed by the mobile communication device and the steps comprising:
receiving a description of a screen from a backend service server, wherein the backend service server is in communication with a first server hosting a software application which the mobile communication device attempts to access, and the software application comprises a tax return preparation software application;
identifying, by the mobile communication device, a plurality of data models for the screen by extracting the plurality of data models from the description;
generating, by the mobile communication device, at least one inquiry of whether a first painter application receiving the at least one inquiry has native capability to paint the screen based at least in part upon the description;
communicating the at least one inquiry to at least a second painter application of a plurality of painter applications on the mobile communications device;
at least the second painter application receiving the at least one inquiry and generating respective responses to the at least one inquiry, wherein a transmission of the at least one inquiry to a third painter application is skipped based at least in part upon the respective responses of at least the first painter application;

selecting a painter application from the plurality of painter applications, wherein the painter application that has been selected is not the third painter application; and painting the screen by transforming at least one data model of the one or more data models into content of the screen by the painter application that has been selected.

18. The computer program product of claim 17, wherein the set of acts further comprises:

a control code module configured to transmit the at least one inquiry to the plurality of painter applications excluding the third painter application;

the control code module further configured to receive the respective responses generated by at least one or more decision code modules of the plurality of-painter applications; and the control code module further configured to select the painter application based in part or in whole upon the respective responses.

19. The computer program product of claim 17, the set of acts further comprising:

detecting a change in an orientation of a display of the mobile communication device using at least an accelerometer in the mobile communication device; and repainting the screen with the painter application that has been selected by transforming the at least one data model of the plurality of data models into content of the screen based in part upon the change in the orientation of the display of the mobile communication device.

* * * * *